(12) United States Patent
Waller, Jr. et al.

(10) Patent No.: US 8,329,034 B2
(45) Date of Patent: *Dec. 11, 2012

(54) FUNCTIONALIZED NONWOVEN ARTICLE

(75) Inventors: Clinton P. Waller, Jr., White Bear Lake, MN (US); Douglas E. Weiss, Golden Valley, MN (US); Catherine A. Bothof, Stillwater, MN (US); Kannan Seshadri, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 228 days.

This patent is subject to a terminal disclaimer.

(21) Appl. No.: 12/819,261

(22) Filed: Jun. 21, 2010

(65) Prior Publication Data

US 2010/0320138 A1 Dec. 23, 2010

Related U.S. Application Data

(60) Provisional application No. 61/219,497, filed on Jun. 23, 2009.

(51) Int. Cl.
*B01D 24/00* (2006.01)
*B01D 37/00* (2006.01)
(52) U.S. Cl. ... 210/338; 210/634; 210/767; 210/500.21; 210/506; 210/503
(58) Field of Classification Search ............... 210/493.4, 210/493.5, 496, 507; 442/58
See application file for complete search history.

(56) References Cited

U.S. PATENT DOCUMENTS

| | | | |
|---|---|---|---|
| 1,529,256 A | 3/1925 | Kelley | |
| 3,352,424 A | 11/1967 | Guebert | |
| 3,849,241 A | 11/1974 | Butin et al. | |
| 3,876,738 A | 4/1975 | Marinaccio et al. | |
| 4,118,531 A | 10/1978 | Hauser | |
| 4,157,418 A | 6/1979 | Heilmann | |
| 4,339,473 A | 7/1982 | D'Agostino et al. | |
| 4,340,057 A | 7/1982 | Bloch et al. | |
| 4,346,142 A | 8/1982 | Lazear | |
| T103601 I4 | 11/1983 | Repetti | |
| 4,451,619 A | 5/1984 | Heilmann | |
| 4,473,474 A | 9/1984 | Ostreicher et al. | |
| 4,529,256 A | 7/1985 | Kretzschmar et al. | |
| 4,539,256 A | 9/1985 | Shipman | |
| 4,563,388 A | 1/1986 | Bonk et al. | |
| 4,618,533 A | 10/1986 | Steuck | |

(Continued)

FOREIGN PATENT DOCUMENTS

CA 2422738 4/2002

(Continued)

OTHER PUBLICATIONS

PCT International Search Report, PCT/US2010/038488.

(Continued)

*Primary Examiner* — Krishnan S Menon
*Assistant Examiner* — Allison M Gionta
(74) *Attorney, Agent, or Firm* — Kent S. Kokko

(57) ABSTRACT

A grafted nonwoven substrate is disclosed having average fiber sizes of 0.7 to 15 microns, and a void volume of 50 to 95%, and a polymer comprising anionic monomer units grafted to the surface of the nonwoven substrate. The article may be used as a filter element to purify or separate target materials, such as monoclonal antibodies (MAb), from a fluid mixture.

22 Claims, 4 Drawing Sheets

U.S. PATENT DOCUMENTS

| | | | |
|---|---|---|---|
| 4,707,265 A | 11/1987 | Barnes, Jr. et al. | |
| 4,726,989 A | 2/1988 | Mrozinski | |
| 4,734,208 A | 3/1988 | Pall et al. | |
| 4,769,273 A | 9/1988 | Hoeschele | |
| 4,773,903 A | 9/1988 | Weisman et al. | |
| 4,837,067 A | 6/1989 | Carey, Jr. et al. | |
| 4,867,881 A | 9/1989 | Kinzer | |
| 4,885,086 A | 12/1989 | Miura | |
| 4,936,934 A | 6/1990 | Buehning | |
| 4,944,879 A | 7/1990 | Steuck | |
| 4,968,733 A | 11/1990 | Muller et al. | |
| 4,981,730 A | 1/1991 | Zaleski | |
| 4,985,298 A | 1/1991 | Buckley et al. | |
| 5,006,247 A | 4/1991 | Dennison et al. | |
| 5,061,751 A | 10/1991 | Patton | |
| 5,064,866 A | 11/1991 | Toyomoto et al. | |
| 5,071,880 A | 12/1991 | Sugo et al. | |
| 5,075,342 A | 12/1991 | Ishigaki et al. | |
| 5,120,594 A | 6/1992 | Mrozinski | |
| 5,160,627 A | 11/1992 | Cussler et al. | |
| 5,180,492 A | 1/1993 | Ohnishi et al. | |
| 5,202,025 A | 4/1993 | Onishi et al. | |
| 5,209,849 A | 5/1993 | Hu et al. | |
| 5,229,172 A | 7/1993 | Cahalan et al. | |
| 5,260,360 A | 11/1993 | Mrozinski et al. | |
| 5,282,971 A | 2/1994 | Degen et al. | |
| 5,290,871 A | 3/1994 | Ahmed et al. | |
| 5,308,641 A | 5/1994 | Cahalan et al. | |
| 5,336,698 A | 8/1994 | Kashiwagi et al. | |
| 5,344,701 A | 9/1994 | Gagnon et al. | |
| 5,350,805 A | 9/1994 | Lin | |
| 5,429,629 A * | 7/1995 | Latimer et al. | 604/378 |
| 5,439,983 A | 8/1995 | Ahmed et al. | |
| 5,453,467 A | 9/1995 | Bamford et al. | |
| 5,503,746 A | 4/1996 | Gagnon | |
| 5,506,279 A | 4/1996 | Babu et al. | |
| 5,531,900 A | 7/1996 | Raghavan et al. | |
| 5,547,576 A | 8/1996 | Onishi et al. | |
| 5,578,400 A | 11/1996 | Gineste et al. | |
| 5,623,044 A | 4/1997 | Chiao | |
| 5,627,217 A | 5/1997 | Rilling et al. | |
| 5,648,400 A | 7/1997 | Sugo et al. | |
| 5,652,050 A | 7/1997 | Pall et al. | |
| 5,736,051 A | 4/1998 | Degen et al. | |
| 5,782,908 A | 7/1998 | Cahalan et al. | |
| 5,804,263 A | 9/1998 | Goldberg et al. | |
| 5,846,438 A | 12/1998 | Pall et al. | |
| 5,871,823 A | 2/1999 | Anders et al. | |
| 5,906,734 A | 5/1999 | Girot et al. | |
| 5,914,182 A | 6/1999 | Drumheller | |
| 5,962,544 A | 10/1999 | Waller, Jr. | |
| 6,018,009 A | 1/2000 | Heilmann | |
| 6,033,719 A | 3/2000 | Keogh | |
| 6,039,872 A | 3/2000 | Wu et al. | |
| 6,056,529 A | 5/2000 | Meyering et al. | |
| 6,063,484 A | 5/2000 | Exsted et al. | |
| 6,096,293 A | 8/2000 | Stringer et al. | |
| 6,096,369 A | 8/2000 | Anders et al. | |
| 6,230,776 B1 | 5/2001 | Choi | |
| 6,245,922 B1 | 6/2001 | Heilmann et al. | |
| 6,258,276 B1 | 7/2001 | Mika et al. | |
| 6,264,044 B1 | 7/2001 | Meyering et al. | |
| 6,280,853 B1 | 8/2001 | Mickols | |
| 6,287,730 B1 | 9/2001 | Callahan et al. | |
| 6,315,130 B1 | 11/2001 | Olsen | |
| 6,387,379 B1 | 5/2002 | Goldberg et al. | |
| 6,391,200 B2 | 5/2002 | Pulek et al. | |
| 6,413,070 B1 | 7/2002 | Meyering et al. | |
| 6,448,301 B1 | 9/2002 | Gaddam et al. | |
| 6,458,269 B1 | 10/2002 | Bassett et al. | |
| 6,464,084 B2 | 10/2002 | Pulek | |
| 6,506,847 B1 | 1/2003 | Song | |
| 6,511,600 B1 * | 1/2003 | Ohtani | 210/500.41 |
| 6,513,666 B2 | 2/2003 | Meyering et al. | |
| 6,521,011 B1 | 2/2003 | Sundet et al. | |
| 6,537,411 B1 | 3/2003 | Kang et al. | |
| 6,596,167 B2 | 7/2003 | Ji et al. | |
| 6,635,104 B2 | 10/2003 | Komkova et al. | |
| 6,660,376 B1 | 12/2003 | Zimmel et al. | |
| 6,669,994 B2 | 12/2003 | Swan et al. | |
| 6,712,966 B1 | 3/2004 | Pulek et al. | |
| 6,743,878 B2 | 6/2004 | Bowers et al. | |
| 6,773,654 B2 | 8/2004 | Sugo et al. | |
| 6,776,940 B2 | 8/2004 | Meyering et al. | |
| 6,811,837 B2 | 11/2004 | Iwasa et al. | |
| 6,818,038 B2 | 11/2004 | Sugo et al. | |
| 6,828,386 B2 | 12/2004 | MacKinnon | |
| 6,844,371 B1 | 1/2005 | Komatsu et al. | |
| 6,852,802 B1 | 2/2005 | Komatsu et al. | |
| 6,861,001 B2 | 3/2005 | Lee et al. | |
| 6,939,466 B2 | 9/2005 | Pulek et al. | |
| 7,048,855 B2 | 5/2006 | de la Cruz | |
| 7,067,058 B2 | 6/2006 | Yeh et al. | |
| 7,073,671 B2 | 7/2006 | Charkoudian | |
| 7,094,469 B2 | 8/2006 | Moya | |
| 7,112,389 B1 | 9/2006 | Arora et al. | |
| 7,125,603 B2 | 10/2006 | David et al. | |
| RE39,399 E | 11/2006 | Allen | |
| 7,135,230 B2 | 11/2006 | Nakao et al. | |
| 7,160,464 B2 | 1/2007 | Lee et al. | |
| 7,169,933 B2 | 1/2007 | Benson et al. | |
| 7,170,739 B1 | 1/2007 | Arora et al. | |
| 7,178,676 B2 | 2/2007 | Pulek et al. | |
| 7,204,997 B2 | 4/2007 | Bromberg et al. | |
| 7,235,122 B2 | 6/2007 | Bryner et al. | |
| 7,247,370 B2 | 7/2007 | Childs et al. | |
| 7,316,919 B2 | 1/2008 | Childs et al. | |
| 7,338,692 B2 | 3/2008 | Smith et al. | |
| 7,361,767 B2 | 4/2008 | Benson et al. | |
| 7,374,416 B2 | 5/2008 | Cook et al. | |
| 7,402,678 B2 | 7/2008 | Benson et al. | |
| 7,604,746 B2 | 10/2009 | Childs et al. | |
| 2002/0001834 A1 | 1/2002 | Keogh | |
| 2003/0134551 A1* | 7/2003 | Sugo et al. | 442/59 |
| 2004/0116026 A1 | 6/2004 | Kubose et al. | |
| 2004/0116028 A1 | 6/2004 | Bryner | |
| 2004/0203149 A1 | 10/2004 | Childs et al. | |
| 2004/0242714 A1 | 12/2004 | Penezina et al. | |
| 2005/0058821 A1 | 3/2005 | Smith et al. | |
| 2005/0118425 A1 | 6/2005 | Childs et al. | |
| 2005/0133441 A1 | 6/2005 | Charkoudian | |
| 2005/0142296 A1 | 6/2005 | Lakshmi | |
| 2005/0165167 A1 | 7/2005 | MacKinnon | |
| 2005/0199335 A1 | 9/2005 | Oehl et al. | |
| 2006/0016748 A1 | 1/2006 | Koguma et al. | |
| 2006/0023487 A1 | 2/2006 | Fang et al. | |
| 2006/0107639 A1 | 5/2006 | Hamlin et al. | |
| 2006/0121217 A1* | 6/2006 | Childs et al. | 428/34.1 |
| 2006/0165999 A1* | 7/2006 | Fansler et al. | 428/411.1 |
| 2006/0178070 A1 | 8/2006 | Kritzer et al. | |
| 2007/0039874 A1 | 2/2007 | Kniajanski et al. | |
| 2007/0042015 A1 | 2/2007 | Berry et al. | |
| 2007/0065490 A1 | 3/2007 | Schabert et al. | |
| 2007/0138084 A1* | 6/2007 | Galvin et al. | 210/490 |
| 2007/0154651 A1* | 7/2007 | Weiss et al. | 427/532 |
| 2007/0154703 A1 | 7/2007 | Waller et al. | |
| 2007/0221569 A1 | 9/2007 | Stouffer et al. | |
| 2008/0017578 A1 | 1/2008 | Childs et al. | |
| 2008/0230471 A1 | 9/2008 | Tamada et al. | |
| 2008/0264867 A1 | 10/2008 | Mika et al. | |
| 2009/0020472 A1 | 1/2009 | Lucas et al. | |
| 2009/0032463 A1 | 2/2009 | Childs et al. | |
| 2009/0035552 A1 | 2/2009 | Childs et al. | |
| 2009/0098359 A1 | 4/2009 | Waller, Jr. et al. | |
| 2009/0176052 A1 | 7/2009 | Childs et al. | |

FOREIGN PATENT DOCUMENTS

| | | |
|---|---|---|
| EP | 0 779 387 | 6/1997 |
| EP | 1 228 756 | 8/2002 |
| EP | 1 552 878 | 7/2005 |
| EP | 2 036 930 | 3/2009 |
| JP | 62298405 | 12/1987 |
| JP | 63240902 | 10/1988 |
| JP | 5111607 | 5/1993 |
| JP | 08290066 | 11/1996 |
| JP | 10085572 | 4/1998 |
| JP | 10279713 | 10/1998 |

| | | |
|---|---|---|
| JP | 2002371471 | 12/2002 |
| JP | 2003301059 | 10/2003 |
| JP | 2004073943 | 3/2004 |
| WO | WO 89/09246 | 10/1989 |
| WO | WO 97/18904 | 5/1997 |
| WO | WO 00/01468 | 1/2000 |
| WO | WO 00/22032 | 4/2000 |
| WO | WO 00/54866 | 9/2000 |
| WO | WO 01/96487 | 12/2001 |
| WO | WO 02/060509 | 8/2002 |
| WO | WO 03/008011 | 1/2003 |
| WO | WO 2004/002714 | 1/2004 |
| WO | WO 2005/035641 | 4/2005 |
| WO | WO 2007/001405 | 1/2007 |
| WO | WO 2007/078878 | 7/2007 |
| WO | WO 2009/085726 | 7/2009 |
| WO | WO 2009/086347 | 7/2009 |
| WO | WO 2009/127285 | 10/2009 |

OTHER PUBLICATIONS

Barner, L., et al., "Reversible Addition-Fragmentation Chain Transfer Graft Copolymerization of Styrene and m-Isopropenyl-α,α'-dimethylbenzyl Isocyanate from Polypropylene Lanterns: Solid Phases for Scavenging Applications." Journal of Polymer Science: Part A: Polymer Chemistry, vol. 44, 2006, pp. 857-864.

Barsbay, M. et al., "Verification of Controlled Grafting of Styrene from Cellulose via Radiation-Induced RAFT Polymerization," Macromolecules, vol. 40, No. 20, 2007, pp. 7140-7147.

Buehler et al., "Solvent Effects on the Permeability of Membrane-Supported Gels," Ind. Eng. Chem. Res., vol. 41, No. 3, pp. 464-472, (2002).

Burke, J., "Solubility Parameters: Theory and Application," AIC Book and Paper Group Annual, vol. 3, (1984), pp. 13-58.

Chen, J., et al., "Grafting copolymerization of acrylamides onto preirradiated PP Films," Radiation Physics and Chemistry, vol. 55, (1999), pp. 87-92.

Childs, et al., "Nanofiltration using pore-filled membranes: effect of polyelectrolyte composition on performance", Separation and Purification Technology; 22-23 (2001), pp. 507-517.

Davies, "The Separation of Airborne Dust and Particles," The Institution of Mechanical Engineers, Proceedings (B), vol. 1B, Nos. 1-12, pp. 185-213, (1952-1953).

DuPont™ brochure entitled, "DuPont™ Hybrid Membrane Technology—Nanofiber Science to Revolutionize Filtration, Energy Storage and Beyond," Copyright © 2007, 4 pages.

Franken, A. et al., "Wetting Criteria for the Applicability of Membrane Distillation," Journal of Membrane Science, vol. 33, (1987), pp. 315-328.

Ghosh, "Protein separation using membrane chromatography: opportunities and challenges," Journal of Chromatography A., vol. 952, Issues 1-2, pp. 13-27, Apr. 5, 2002.

Grasselli, M. et al., "Electron-beam induced RAFT-graft polymerization of poly(acrylic acid) onto PVDF," Nuclear Instruments and Methods in Physics Research B, vol. 236, 2005, pp. 202-207.

Gupta, B., et al., Preirradiation grafting of acrylonitrile onto polypropylene monofilament for biomedical applications: I. Influence of synthesis conditions, Radiation Physics and Chemistry, vol. 75, (2006), pp. 161-167.

Ito, et al., "pH-Sensitive Gating by Conformational Change of a Polypeptide Brush Grafted onto a Porous Polymer Membrane," Journal of the American Chemical Society, vol. 119, pp. 1619-1623, (1997).

Jianqin, L., et al., "Pre-irradiation grafting of temperature sensitive hydrogel on cotton cellulose fabric," Radiation Physics and Chemistry, vol. 55, (1999), pp. 55-59.

Kanani et al., "Separation of human plasma proteins HAS and HIgG using high-capacity macroporous gel-filled membranes," Biochemical Engineering Journal, vol. 35, pp. 295-300, (2007).

Kanani, et al., "Protein bioseparation by membrane chromatography using polyelectrolyte gel-coated adsorptive membranes," Department of Chemical Engineering, McMaster University, 7 pages.

Kavakli, et al., "Radiation-induced grafting of dimethylaminoethylmethacrylate onto PE/PP nonwoven fabric," Science Direct, Nuclear Instruments and Methods in Physics Research B, vol. 265, pp. 204-207, (2007).

Kavakli, et al., "Radiation-induced grafting of dimethylaminoethylmethacrylate onto PE/PP nonwoven fabric," Nuclear Instruments and Methods in Physics Research B, vol. 265, pp. 204-207, 2007.

Kawai et al., "Protein binding to polymer brush, based on ion-exchange, hydrophobic, and affinity interactions," Journal of Chromatography B, vol. 790, Issues 1-2, pp. 131-142, Jun. 25, 2003.

Kiani, K., et al., "Raft Mediated Surface Grafting of t-Butyl Acrylate onto an Ethylene-Propylene Copolymer Initiated by Gamma-Radiation," Journal of Polymer Science: Part A: Polymer Chemistry, vol. 45, 2007, pp. 1074-1083.

Kim et al., "Diffusion and Flow through Polymer-Lined Micropores," Ind. Eng. Chem. Res., vol. 30, pp. 1008-1016, (1991).

Latulippe, et al., "Characterization of Gel-Filled Membranes for Plasma Protein Fractionation," Department of Chemical Engineering, McMaster University, 4 pages.

Mika et al., "Acid/base properties of poly(4-vinylpyridine) anchored within microporous membranes," Journal of Membrane Science, vol. 152, pp. 129-140, (1999).

Mika et al., "Chemical valves based on poly(4-vinylpyridine)-filled microporous membranes," Journal of Membrane Science, vol. 153, pp. 45-56, (1999).

Mika et al., "Porous, polyelectrolyte-filled membranes: Effect of cross-linking on flux and separation", Journal of Membrane Science, 135 (1997), pp. 81-92.

Mika et al., "Salt separation and hydrodynamic permeability of porous membrane filled with pH-sensitive gel," Journal of Membrane Science, vol. 206, pp. 19-30, (2002).

Mika, et al., "A new class of polyelectrolyte-filled microfiltration membranes with environmentally controlled porosity", Journal of Membrane Science, 108 (1995) pp. 37-56.

Mika, et al., "Poly(4-vinylpyridine)-filled microfiltration membranes: physicochemical properties and morphology", Journal of Membrane Science, 136 (1997), pp. 221-232.

Nho, Y., et al., "Grafting polymerization of styrene onto preirradiated polypropylene fabric," Radiation and Physics and Chemistry, vol. 54, (1999), pp. 317-322.

Osada et al., "Control of Water Permeability by Mechanochemical Contraction of Poly(Methacrylic Acid)-Grafted Membranes," Journal of Membrane Science, vol. 27, pp. 327-338, (1986).

Pietrucha, K., "Effect of Chain Transfer Agent on the Radiation Grafting of Methyl Methacrylate Onto Chromium (III) Crosslinked Collagen," Journal of Radioanalytical and Nuclear Chemistry, vol. 149, No. 2, (1991), pp. 327-331.

Shaozao, T., et al., "Effect of Gamma Ray Irradiation on Properties of Polypropylene Fibers and Nonwoven Fabrics," vol. 22, No. 6, (1999), pp. 18-21.

Suryanarayan et al., "The effect of gel layer thickness on the salt rejection performance of polyelectrolyte gel-filled nanofiltration membranes," Journal of Membrane Science, vol. 290, pp. 196-206, (2007).

Ulbricht et al., "Porous Polypropylene Membranes with Different Carboxyl Polymer Brush Layers for Reversible Protein Binding via Surface-Initiated Graft Copolymerization," Chem. Mater, vol. 17, No. 10, pp. 2622-2631, (2005).

Ulbricht, "Advanced functional polymer membranes," Polymer, vol. 47, pp. 2217-2262, (2007).

Wente et al., "Manufacture of Superfine Organic Fibers," Navel Research Laboratories Report No. 4364, (1954).

Wente, "Superfine Thermoplastic Fibers," Industrial and Engineering Chemistry, Naval Research Laboratory, vol. 48, No. 8, pp. 1342-1346, (1956).

Winnik et al., "Polyacrylic acid pore-filled microporous membranes and their use in membrane-mediated synthesis of nanocrystalline ferrihydrite," Can. J. Chem., vol. 76, pp. 10-17, (1998).

Zazzera et al., "XPS and SIMS Study of Anhydrous HF and UV/Ozone-Modified Silicon (100) Surfaces," J. Electrochem. Soc., vol. 136, No. 2, (1989), pp. 484-491.

Zhang et al., "pH Control of Transport through a Porous Membrane Self-Assembled with a Poly(acrylic acid) Loop Brush," Langmuir, vol. 17, pp. 8336-8340, (2001).

Zhou et al., "Pore-filled nanofiltration membranes based on poly(2-acrylamido-2-methylpropanesulfonic acid) gels," Journal of Membrane Science, vol. 254, pp. 89-99, (2005).

* cited by examiner

FUNCTIONALIZED NONWOVEN ARTICLE

CROSS REFERENCE TO RELATED APPLICATION

This application claims the benefit of U.S. Provisional Patent Application No. 61/219,497, filed Jun. 23, 2009, the disclosure of which is incorporated by reference herein in its entirety.

The present disclosure relates to functionalized nonwoven substrates, and methods for preparing the same. The present disclosure further relates to a filter using the functionalized nonwoven substrate and a method of filtering a fluid. The functionalized substrates are useful in selectively filtering and removing biological materials, such as biocontaminates, from biological samples.

BACKGROUND

Detection, quantification, isolation and purification of target biomaterials, such as viruses and biomacromolecules (including constituents or products of living cells, for example, proteins, carbohydrates, lipids, and nucleic acids) have long been objectives of investigators. Detection and quantification are important diagnostically, for example, as indicators of various physiological conditions such as diseases. Isolation and purification of biomacromolecules, such as monoclonal antibodies, produced from cell cultures are important for therapeutic and in biomedical research. Biomacromolecules such as enzymes have been isolated, purified, and then utilized for the production of sweeteners, antibiotics, and a variety of organic compounds such as ethanol, acetic acid, lysine, aspartic acid, and biologically useful products such as antibodies and steroids.

Chromatographic separation and purification operations can be performed on biological product mixtures, based on the interchange of a solute between a moving phase, which can be a gas or liquid, and a stationary phase. Separation of various solutes of the solution mixture is accomplished because of varying binding interactions of each solute with the stationary phase; stronger binding interactions generally result in longer retention times when subjected to the dissociation or displacement effects of a mobile phase compared to solutes which interact less strongly and, in this fashion, separation and purification can be effected.

Most current capture or purification chromatography is done via conventional column techniques. These techniques have severe bottlenecking issues in downstream purification, as the throughput using chromatography is low. Attempts to alleviate these issues include increasing the diameter of the chromatography column, but this in turn creates challenges due to difficulties of packing the columns effectively and reproducibly. Larger column diameters also increase the occurrence of problematic channeling. Also, in a conventional chromatographic column, the absorption operation is conducted until a pre-determined loading of the resin with the binding chemical species, so as to not have breakthrough of the species; this is done either to prevent loss of valuable product, or to prevent contaminants from continuing to remain in the flow-through). This causes the dynamic or effective capacity of the adsorption media to be significantly less than the overall or static capacity.

When using a selective Protein A column, small amounts of contamination remaining after the primary capture steps will bind to the Protein A resin in the column. This contamination, albeit at a low concentration, will be released during product elution. The product fluid stream will need to be "polished" to remove the trace impurities such as host cell proteins and viruses to make a safe viable pharmaceutical or biological product.

Polymeric resins are widely used for the separation and purification of various target compounds. For example, polymeric resins can be used to purify or separate a target compound based on the presence of an ionic group, based on the size of the target compound, based on a hydrophobic interaction, based on an affinity interaction, or based on the formation of a covalent bond. There is a need in the art for functionalized membranes that overcome limitations in diffusion and binding, and that may be operated at high throughput and at lower pressure drops. There is a need in the art for polymeric substrates having enhanced affinity for selective removal of biocontaminates, such host cell proteins, cell debris, DNA fragments, viruses and cell debris from biological feed-streams in the production of monoclonal antibodies. There is also the need to have functionalized structures that overcome diffusion and productivity limitations in bind-and-elute operations, wherein the valuable antibody product is bound to a ligand so as to allow clearance of impurities such as leached Protein A, to be eluted after a predetermined loading of the antibody is reached.

SUMMARY

The present disclosure provides an article comprising a nonwoven substrate having average fiber sizes of 0.7 to 15 microns, and a void volume of 50 to 95%, and a polymer comprising anionic monomer units, such as 2-acrylamido-2-methylpropanesulphonic acid, grafted to the surface of the nonwoven substrate. The article may be used as a filter element to purify or separate target materials, such as host cell proteins, DNA fragments, viruses, and cell debris, oligonucleotides or therapeutic proteins such as monoclonal antibodies (MAb), from a fluid mixture, such as those fluids produced by common cell product harvesting techniques.

The term "target material" refers to one or more chemical species for which the grafted nonwoven substrate is designed to separate from a liquid feed stream or solution mixture feed stream. Target molecules can include, for example, pharmaceutical species; biomacromolecules such as, proteins and antibodies (monoclonal or polyclonal), DNA, and RNA, expressed by bacterial, yeast, mammalian, plant, or insect cells; minerals; and manmade chemical species such as, for example, synthetic small organic molecules, peptides and polypeptides, oligosaccharides, and sugar modified proteins. In some embodiments, the target molecule can be one or more impurities or waste products, including proteins; inorganic species such as metals, metal ions, or ions such as carbonates, sulfates, oxides, phosphates, bicarbonates, and other ions commonly found in industrial, residential and biological feed streams; small organic molecules such as those that comprise, but are not limited to, dyes, pesticides, fertilizers, additives, and stabilizers; process byproducts and pollutants; DNA, RNA, phospholipids, viruses, or other cell debris from a bioprocess. In still a further embodiment, leached ligands such as, for example, protein A from an upstream affinity separation process could also be a target molecule. In other embodiments, the article described herein could be used to remove various chemical or biological species from a waste or drinking water stream.

One of more layers of the article of this disclosure may be used in depth-type filtration applications, each of which layers may have the same, or different average fiber size, void volume, degree of polymer grafting, monomer composition of grafted polymer, porosity, loft, tensile strength and surface area. The functionalized substrate may further be used in combination with conventional filtration elements such as porous or microporous membranes.

This disclosure further provides a method of making the article comprising the steps of providing a nonwoven substrate, exposing the nonwoven substrate to ionizing radiation in an inert atmosphere, and subsequently imbibing the exposed substrate with a solution comprising grafting anionic monomers to graft polymerize said monomers to the surface of the nonwoven substrate.

DETAILED DESCRIPTION

Figure 1:
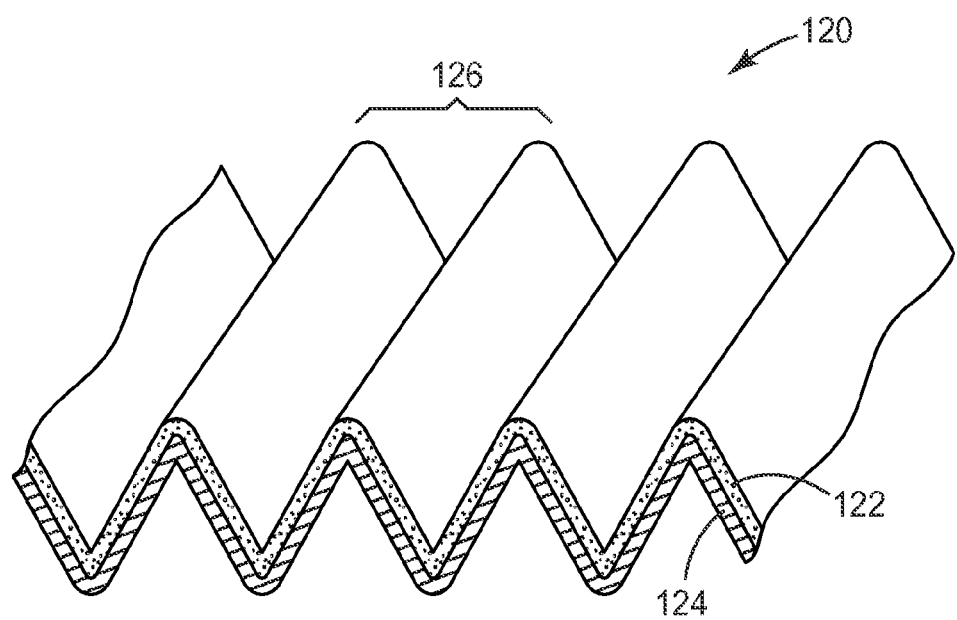
FIG. 1 is a perspective view of an exemplary embodiment of a filter media according to the present disclosure formed into a plurality of pleats.

The present disclosure provides an article comprising a nonwoven substrate having average fiber sizes of 0.7 to 15 microns, and a void volume of 50 to 95%, and a polymer comprising anionic monomer units grafted to the surface of the nonwoven substrate. The polymer functionalized article may be described as a discontinuous, uncrosslinked hydrogel polymer, initiated from free radicals formed on a nonwoven substrate by ionizing radiation and the subsequent graft-polymerization of the monomers in an aqueous or aqueous/organic solvent solution. As used herein, a "hydrogel" is a water-containing gel; polymer chains that are hydrophilic and will absorb water, yet is insoluble in water. The term hydrogel is used regardless of the state of hydration.

The nonwoven substrate is a nonwoven web which may include nonwoven webs manufactured by any of the commonly known processes for producing nonwoven webs. As used herein, the term "nonwoven web" refers to a fabric that has a structure of individual fibers or filaments which are randomly and/or unidirectionally interlaid in a mat-like fashion.

For example, the fibrous nonwoven web can be made by carded, air laid, wet laid, spunlaced, spunbonding, electrospinning or melt-blowing techniques, such as melt-spun or melt-blown, or combinations thereof. Spunbonded fibers are typically small diameter fibers that are formed by extruding molten thermoplastic polymer as filaments from a plurality of fine, usually circular capillaries of a spinneret with the diameter of the extruded fibers being rapidly reduced. Meltblown fibers are typically formed by extruding the molten thermoplastic material through a plurality of fine, usually circular, die capillaries as molten threads or filaments into a high velocity, usually heated gas (e.g., air) stream which attenuates the filaments of molten thermoplastic material to reduce their diameter. Thereafter, the meltblown fibers are carried by the high velocity gas stream and are deposited on a collecting surface to from a web of randomly disbursed meltblown fibers. Any of the non-woven webs may be made from a single type of fiber or two or more fibers that differ in the type of thermoplastic polymer and/or thickness.

Staple fibers may also be present in the web. The presence of staple fibers generally provides a loftier, less dense web than a web of only melt blown microfibers. Preferably, no more than about 20 weight percent staple fibers are present, more preferably no more than about 10 weight percent. Such webs containing staple fiber are disclosed in U.S. Pat. No. 4,118,531 (Hauser) which is incorporated herein by reference.

The nonwoven article may optionally further comprise one or more layers of scrim. For example, either or both major surfaces may each optionally further comprise a scrim layer. The scrim, which is typically a woven or nonwoven reinforcement made from fibers, is included to provide strength to the nonwoven article. Suitable scrim materials include, but are not limited to, nylon, polyester, fiberglass, and the like. The average thickness of the scrim can vary. Typically, the average thickness of the scrim ranges from about 25 to about 100 micrometers, preferably about 25 to about 50 micrometers. The layer of the scrim may optionally be bonded to the nonwoven article. A variety of adhesive materials can be used to bond the scrim to the polymeric material. Alternatively, the scrim may be heat-bonded to the nonwoven.

The microfibers of the nonwoven substrate typically have an effective fiber diameter of from about 0.5 to 15 micrometers preferably from about 1 to 6 micrometers, as calculated according to the method set forth in Davies, C. N., "The Separation of Airborne Dust and Particles," Institution of Mechanical Engineers, London, Proceedings 1B, 1952. The nonwoven substrate preferably has a basis weight in the range of about 10 to 400 g/m$^2$, more preferably about 10 to 100 g/m$^2$. The average thickness of the nonwoven substrate is preferably about 0.1 to 10 mm, more preferably about 0.25 to 5 mm for the non-functionalized, uncalendared substrate. The minimum tensile strength of the nonwoven web is about 4.0 Newtons. It is generally recognized that the tensile strength of nonwovens is lower in the machine direction than in the cross-web direction due to better fiber bonding and entanglement in the latter.

Nonwoven web loft is measured by solidity, a parameter that defines the solids fraction in a volume of web. Lower solidity values are indicative of greater web loft. Useful nonwoven substrates have a solidity of less than 20%, preferably less than 15%. Solidity is a unitless fraction typically represented by α:

$$\alpha = m_f \div \rho_f \times L_{nonwoven}$$

where $m_f$ is the fiber mass per sample surface area, which $\rho_f$ is the fiber density; and $L_{nonwoven}$ is the nonwoven thickness. Solidity is used herein to refer to the nonwoven substrate itself and not to the functionalized nonwoven. When a nonwoven substrate contains mixtures of two or more kinds of fibers, the individual solidities are determined for each kind of fiber using the same $L_{nonwoven}$ and these individual solidities are added together to obtain the web's solidity, α.

As an example, the nonwoven substrate before calendering or grafting preferably has an average pore size of 14 μm, calculated from a thickness of 0.34 mm, effective fiber diameter of 4.2 um and solidity of 13%. After calendering the nonwoven web will have a thickness of 0.24 mm and solidity of 18% with an average pore size of 8 μm. The term "average pore size" (also known as average pore diameter) is related to the arithmetic median fiber diameter and web solidity and can be determined by the following formula: where D is the average pore size, $d_f$ is arithmetic median fiber diameter, and α is the web solidity.

$$D = d_f \left\{ \left(\frac{2\alpha}{\pi}\right)^{-1/2} - 1 \right\}$$

The nonwoven substrate preferably has a mean pore size of 1-40 microns, preferably 2-20 microns. Mean pore size may be measured according to ASTM F 316-03 "Standard Test Methods for Pore Size Characteristics of Membrane Filters by Bubble Point and Mean Flow Pore Test Method B" using Freon TF™ as the test fluid.

The nonwoven substrate may be formed from any suitable thermoplastic polymeric material. Suitable polymeric materials include, but are not limited to, polyolefins, poly(isoprenes), poly(butadienes), fluorinated polymers, chlorinated polymers, polyamides, polyimides, polyethers, poly(ether sulfones), poly(sulfones), poly(vinyl acetates), copolymers of vinyl acetate, such as poly(ethylene)-co-poly(vinyl alcohol)-poly(phosphazenes), poly(vinyl esters), poly(vinyl ethers), poly(vinyl alcohols), and poly(carbonates).

Suitable polyolefins include, but are not limited to, poly(ethylene), poly(propylene), poly(1-butene), copolymers of ethylene and propylene, alpha olefin copolymers (such as copolymers of ethylene or propylene with 1-butene, 1-hexene, 1-octene, and 1-decene), poly(ethylene-co-1-butene) and poly(ethylene-co-1-butene-co-1-hexene).

Suitable fluorinated polymers include, but are not limited to, poly(vinyl fluoride), poly(vinylidene fluoride), copolymers of vinylidene fluoride (such as poly(vinylidene fluoride-co-hexafluoropropylene), and copolymers of chlorotrifluoroethylene (such as poly(ethylene-co-chlorotrifluoroethylene).

Suitable polyamides include, but are not limited to, nylon 6, nylon 6,6, nylon 6,12 poly(iminoadipoyliminohexamethylene), poly(iminoadipoyliminodecamethylene), and polycaprolactam. Suitable polyimides include poly(pyromellitimide).

Suitable poly(ether sulfones) include, but are not limited to, poly(diphenylether sulfone) and poly(diphenylsulfone-co-diphenylene oxide sulfone).

Suitable copolymers of vinyl acetate include, but are not limited to, poly(ethylene-co-vinyl acetate) and such copolymers in which at least some of the acetate groups have been hydrolyzed to afford various poly(vinyl alcohols) including, poly(ethylene-co-vinyl alcohol).

Preferred polymers are inherently hydrophilic and are readily grafted by ionizing radiation, such as by exposure to e-beam or gamma radiation. Preferred polymers include of polyamides and ethylene vinyl alcohol polymers and copolymers. Nylon nonwoven substrates having 1 micron or smaller effective fiber diameters may be chosen from those described in U.S. Pat. No. 7,170,739 (Arora et al.), U.S. Pat. No. 7,112,389 (Arora et al.), U.S. Pat. No. 7,235,122, (Bryner et al.) and U.S. 20040116026 (=WO 04/02714), incorporated herein by reference. Useful nylon nonwoven substrates having 1 micron or smaller effective fiber diameters are also commercially available as HMT™ 16434 and HMT™ 16435 hybrid membrane technology membranes from DuPont, Wilmington, Del.

Further details on the manufacturing method of non-woven webs of this invention may be found in Wente, *Superfine Thermoplastic Fibers,* 48 Indus. Eng. Chem. 1342 (1956), or in Wente et al., *Manufacture Of Superfine Organic Fibers*, (Naval Research Laboratories Report No. 4364, 1954). Useful methods of preparing the nonwoven substrates are described in U.S. RE 39,399 (Allen), U.S. Pat. No. 3,849,241 (Butin et al.), U.S. Pat. No. 7,374,416 (Cook et al.), U.S. Pat. No. 4,936,934 (Buehning), and U.S. Pat. No. 6,230,776 (Choi), each incorporated herein by reference.

In some embodiments, the nonwoven substrate is calendared using a smooth roll that is nipped against another smooth roll. A calendared or compressed nonwoven web provides for a more uniform substrate and dimensional stability in later washing steps to remove unreacted monomers. Thus, in a preferred embodiment, the nonwoven substrate according to the present invention are thermally calendared with a smooth roll and a solid back-up roll (e.g., a metal, rubber, or cotton cloth covered metal) in addition to pattern embossing, described above. During calendering, it is important to closely control the temperature and the pressure of the smooth rolls. In general, the fibers are minimally thermally fused at the points of contact, without imparting undesirable characteristics to the nonwoven substrate such as forming a film or skin on the surface thereof. For example, when using nylon nonwoven substrates, it is preferred to maintain the temperature of the smooth roll between about 40° C. and 100° C., more preferably between about 50° C. and 75° C. In addition, the smooth roll should contact the fibrous web at a pressure of from about 10 kilogram-force/cm to about 50 kilogram-force/cm, more preferably from about 15 kilogram-force/cm to about 30 kilogram-force/cm. The average thickness of the calendared nonwoven substrate is preferably about ⅔ the thickness of the starting nonwoven.

The functionalized article may be described as a discontinuous, uncrosslinked hydrogel polymer, initiated from free radicals formed on a non-woven substrate by ionizing radiation and the subsequent graft-polymerization of the anionic monomers in an imbibing solution. As used herein, a hydrogel is a water-containing gel: a polymer that is hydrophilic and will absorb water, yet is insoluble in water. The term hydrogel is used regardless of the state of hydration.

The grafted polymer comprises polymer tendrils that are initiated from, and supported by, the nonwoven substrate, the polymer chains (tendrils) extending into the interstitial spaces of the nonwoven substrate. The grafted polymer chains have pendent anionic groups, and optional pendent poly(alkylene oxide) groups and other functional groups. In the presence of pure water, the hydrogel reaches a state of maximum hydration and volume. As the polymer tendrils do not bridge and are free to move independently, the grafted nonwoven article may have a large flow response to very low quantities of stimulus.

In contrast to the instant uncrosslinked grafted hydrogel polymer, conventional hydrogels comprise individual polymer strands or tendrils that are crosslinked through multiple crosslinking sites. Due to the crosslinking the molecular weight of the polymer is infinite and the "gel" refers to the swollen polymer network, the properties of which are controlled through polymer concentration, polymer molecular weight and crosslinking density.

Depending on the degree of substitution of the nonwoven substrate and the weight of polymer grafted to the surface thereof, the hydrogel polymer can completely fill the interstitial spaces of the nonwoven substrate thereby providing a barrier which effectively blocks the flow of pure water through the functionalized nonwoven article resulting in the higher backpressure at a given flux rate (constant rate) or very low flux at a given pressure (constant pressure). It is believed that in pure water the negatively charged anionic groups, such as sulfonic acid salts, electrostatically repulse one another causing maximum extension of the grafted polymer chains and consequently maximum hydration of the hydrogel.

When used in filtration, the hydrogel can reversibly expand in response to a very small amount of a "trigger" such as a salt, buffer, organic solvent, temperature, pH, contaminate, or a biomolecule, consequently contracting allowing for higher flux at lower pressure through the hydrogel network. Surprisingly, the grafted hydrogel network does not lose it's filterability in a "triggered" state. In the absence of such a "trigger", the fully expanded hydrogel network can offer resistance to water flux.

In the state of maximum hydration, the hydrogel is constrained only by the nonwoven substrate, most significantly in the x and y axes (coplanar with the nonwoven substrate) and less so in the z axis, normal to the plane of the nonwoven substrate. The gel is less constrained on the z axis. The gel may swell up to 800 percent or more on the z axis, but the x and y axes desirably swell less than 100%, more preferably less than 50%, constrained by the nonwoven substrate.

In the preparation of melt-blown non-woven webs, conditions can be adjusted to maximize the resiliency in the z direction (normal to the plane of the nonwoven by (a) adjusting the die and collector for proper fiber lay-down (b) adjusting melt temp and air temp to prevent fibers from over-fusing and forming fiber-fiber bonds, (c) minimize asymmetry caused by the collector being too close in proximity to the die. It is preferred that nonwoven fibers are below the polymer melt temperature before impinging on the collector to reduce the degree of fiber-fiber links. Desirably, the nonwoven may expand maximally in "z" direction (normal to the plane of the nonwoven) to allow for expansion of the hydrogel.

The hydrogel reversibly contracts and allows water to flow (flux) through the resulting interstices in the presence of dissolved species, such as neutral compounds, salts, buffers and positively charged ions. It is believed the dissolved species such as dissolved ions more effectively charge-couple to the negatively charged anionic groups in the graft polymer so that the electrostatic repulsion between the anionic groups is reduced and the hydrogel constricts or collapses. Alternatively the dissolved species may displace the hydration sphere of the water (and possibly solvent) molecules with the result that the hydrogel collapses around the non-woven substrate. Therefore the article exhibits a stimulus-response hydrogel ("responsive hydrogel") that is discontinuous in nature—able to reversibly open and close the pores or interstices of the hydrogel.

The nonwoven substrate has a polymer comprising anionic monomer units grafted to the surface of the nonwoven substrate. The polymer is grafted to the surface(s) of the nonwoven substrate by ionization initiated polymerization of grafting monomers, which are negatively charged.

The negatively charged anionic monomer has at least one ethylenically unsaturated group capable of undergoing free radical polymerization, and an additional anionic functional group. In some embodiments, the ethylenically unsaturated group is a (meth)acryloyl group or a vinyl group. The anionic monomer can be a weak acid, a strong acid, a salt of a weak acid, a salt of a strong acid, or combinations thereof. That is, the negatively charged ionic monomer can be in a neutral state but capable of being charged if the pH is adjusted. When the pH is suitably adjusted, the resulting cation exchange resins have negatively charged groups capable of interacting with positively charged materials (i.e., cations). If the anionic monomer used to prepare a cation exchange resin includes a salt of a weak acid or a salt of a strong acid, the counter ions of these salts can be, but are not limited to, alkali metals, alkaline earth metals, ammonium ions, or tetraalkylammonium ions.

The anionic monomers may have the general formula:

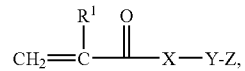

where
R$^1$ is H or CH$_3$;
X is —O— or —NR$^1$—,
Y is a straight or branched chain alkylene, generally from 1 to 10 carbon atoms; and
Z is an anionic group, which may be selected from sulphonic acids groups, phosphonic acid groups, and carboxylic acid groups, and salts thereof.

Some exemplary anionic monomers include (meth)acrylamidosulfonic acids of Formula (II) or salts thereof:

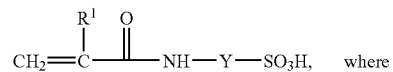

R$^1$ is H or CH$_3$, and Y is a straight or branched alkylene having 1 to 10 carbon atoms. Exemplary ionic monomers according to Formula (II) include, but are not limited to, N-acrylamidomethanesulfonic acid, 2-acrylamidoethanesulfonic acid, 2-acrylamido-2-methylpropanesulfonic acid, and 2-methacrylamido-2-methylpropanesulfonic acid. Salts of these acidic monomers can also be used, examples being (3-sulfopropyl)-methacrylic acid potassium salt and 2-(methacryloyloxy)ethylsulfonic acid sodium salt.

Other suitable anionic monomers for the graft polymer include sulfonic acids such as vinylsulfonic acid and 4-styrenesulfonic acid; (meth)acrylamidophosphonic acids such as (meth)acrylamidoalkylphosphonic acids (e.g., 2-acrylamidoethylphosphonic acid and 3-methacrylamidopropylphosphonic acid); acrylic acid and methacrylic acid; and carboxyalkyl (meth)acrylates such as 2-carboxyethylacrylate, 2-carboxyethylmethacrylate, 3-carboxypropylacrylate, and 3-carboxypropylmethacrylate. Still other suitable acidic monomers include (meth)acryloylamino acids, such as those described in U.S. Pat. No. 4,157,418 (Heilmann), incorporated herein by reference. Exemplary (meth)acryloylamino acids include, but are not limited to, N-acryloylglycine, N-acryloylaspartic acid, N-acryloyl-β-alanine, 2-acrylamidoglycolic acid, 3-acrylamido-3-methylbutyric acid. Salts of any of these acidic monomers can also be used.

The grafted polymer optionally contains monofunctional ethylenically-unsaturated grafting monomer units having a poly(alkylene oxide) group. These monomers copolymerize with the grafting anionic monomers to form a grafted copolymer chain on the surface of the nonwoven substrate. When present, these monomers are used in amounts of 2 to 20 wt. %, more preferably 5 to 10 wt. %, relative to the total monomer weight.

The monomer units having a poly(alkylene oxide) group is of the formula:

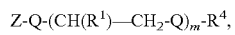

wherein Z is a polymerizable ethylenically unsaturated moiety, R$^1$ is a H or CH$_3$, R$^4$ is a H, a C$_1$ to C$_4$ alkyl group, aryl group, or combinations thereof and m is from 2 to 100, preferably 5 to 20, and Q is a divalent linking group selected from —O—, —NR$^1$—, —CO$_2$— and —CONR$^1$.

In one embodiment, the poly(alkylene oxide) group is a poly(ethylene oxide) (co)polymer. In another embodiment, the pendent poly(alkylene oxide) group is a poly(ethylene oxide-co-propylene oxide) copolymer. Such copolymers may be block copolymers, random copolymers, or gradient copolymers.

Useful ethylenically unsaturated moiety, Z, of the monomer may include:

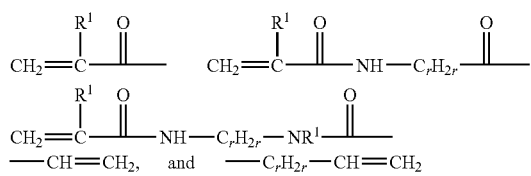

wherein R$^1$ is H or Me and r=1-10.

The monomer having a poly(alkylene oxide) group can be prepared, for example, by reacting mono- or di-functional alkylene oxide (co)polymers (which are typically commercially available) with reactive ethylenically unsaturated compounds (e.g., acrylates). The functional groups terminating the poly(alkylene oxide) may include hydroxy groups, amine groups and carboxyl groups. A variety of reactive ethylenically unsaturated compounds such as acrylate derivatives can be used including, but not limited to, (meth)acrylic acid, (meth)acryloyl chloride, (meth)acrylic anhydride, and 2-isocyanatoethyl (meth)acrylate. Preferably, the monomer is prepared by reacting the mono- or di-functional alkylene oxide (co)polymer with (meth)acrylic anhydride. Typically, if a stoichiometric amount of the ethylenically unsaturated reactant is combined with the monofunctional alkylene oxide (co)polymer (such as a monohydroxy terminated alkylene oxide (co)polymer), 100% conversion to the monosubstituted product is obtained.

Examples of suitable monofunctional poly(alkylene oxide) monomers include poly(ethylene oxide) (meth)acrylate, poly(propylene oxide) (meth)acrylate, poly(ethylene oxide-propylene oxide) (meth)acrylate, and combinations thereof. Such monomers preferably include one nonreactive end group such as (C$_1$-C$_4$) alkoxy, aryloxy (e.g., phenoxy), and (C$_1$-C$_4$) alkaryloxy. These groups can be linear or branched. These monomers can be of a wide range of molecular weights and are commercially available from sources such as Sartomer Company, Exton, Pa.; Shinnakamura Chemical Co., Ltd., Tokyo, Japan; Aldrich, Milwaukee, Wis.; and Osaka Organic Chemical Ind., Ltd., Osaka, Japan.

The grafted polymer optionally contains other ethylenically-unsaturated hydrophilic grafting monomer units; "second hydrophilic monomers". As used herein "second hydrophilic monomers" are those polymerizable monomers having a water miscibility (water in monomer) of at least 1 wt. %, preferably at least 5 weight % without reaching a cloud point, are exclusive of poly(alkylene oxide) monomers and contain no groups that would retard the grafting polymerization. The grafted copolymer may comprise 0 to 10 wt. % of such monomer units. When present, the polymer generally comprises 1 to 10 wt. % of such monomer units.

Examples of suitable second hydrophilic monomers include 2-hydroxyethyl(meth)acrylate (HEMA), 2-hydroxypropyl(meth)acrylate, 3-hydroxypropyl(meth)acrylate, 2,3-dihydroxypropyl (meth)acrylate, 4-hydroxybutyl(meth)acrylate, N-vinyl caprolactam, N-vinyl acetamide, N-vinyl pyrrolidone, acrylonitrile, tetrahydrofurfuryl acrylate, acrylamide, mono- or di-N-alkyl substituted acrylamide, glycerol methacrylate, and combinations thereof. Preferred polar monomers include 2-hydroxyethyl(meth)acrylate (HEMA), N-vinyl pyrrolidone, N-vinyl acetamide, methylacrylamide, and mixtures thereof.

As the polymer is uncrosslinked, the imbibing solution containing the monomer mixture contains no polyethylenically unsaturated monomers; i.e., no crosslinkers.

In general, the grafted (co)polymer comprises:
a) 70 to 100 wt. % of anionic monomers, preferably at least 80 wt. %, more preferable 80 to 98 wt. %;
b) 0 to 20 wt. %, preferably 2 to 20 wt. %, more preferably 5 to 10 wt. % of grafting poly(alkylene oxide) monomers; and
c) 0 to 10 wt. % of second hydrophilic monomers, each weight percentage relative to the weight of total monomer content.

Inclusion of the b) and/or c) monomers are especially useful for enhancing the hydrophilicity of normally hydrophobic nonwoven substrates With such hydrophobic substrates, it is preferred that the monomers are non-zero amounts in the imbibing solution.

Generally, the total grafted monomer content may be from 0.5 to 5 times the weight of the nonwoven substrate. It is desirable to fill the interstitial spaces of the nonwoven substrate but not have the polymer chains bridge to link separate fibers of the nonwoven with grafted polymer strands, as this will restrict expansion of the nonwoven substrate and impede flux. One way to reduce this fiber-fiber bridging by the grafted polymer is to lower the monomer concentration for a given fiber size. It has been determined that the amount of grafted polymer may be maximized by adding a water miscible organic solvent to the grafting imbibing solution to maximize the molecular weight of the grafted hydrogel polymer tendrils and reduce bridging of the tendrils.

The flux pressure buildup resulting from packed hydrogel tendrils in the interstitial spaces of the nonwoven is simply relieved by the ionic trigger or the biological product itself. The benefit from packing the interstitial spaces with hydrogel strands is effectively extending the surface area of the nonwoven to include polymer strands in the void volume where the contamination can displace the water of the hydrogel. The unexpected net effect of nonwovens with grafted hydrogel polymer tendrils in the packed configuration is the ability to hold significantly greater amounts of soluble and insoluble biological contaminants without fouling and the multiple long flexible hydrogel tendrils are capable of multiple bond or hydrogen bonding sites allowing for affinity absorption with greatly improved salt tolerance. In contrast to other microporous substrates, the nonwoven substrate may be considered a scaffold for the grafted polymer, rather than a surface coated substrate.

With regard to the grafting monomers supra, the monomers that are grafted to the surface of the nonwoven substrates usually have either an acrylate or other non-acrylate polymerizable functional group for grafting by e-beam irradiation. Acrylamide or methacrylate groups are preferred for grafting of the monomer to the nonwoven substrate surface (using the process described herein) due to the slower, more uniform reactivity and durability of such methacrylates or acrylamido moieties to nonwovens that have been exposed to e-beam irradiation.

As described in further detail below, functionalized substrates of the present invention may be prepared using above-described monomers to provide a grafted polymer on the surface of a porous nonwoven base substrate. When two or more of the above-described grafting monomers are used, the monomers may be grafted onto the nonwoven base substrate in a single reaction step (i.e., exposure to an ionizing radiation) followed by imbibing with all grafting monomers present or in sequential reaction steps (i.e., a first exposure to ionizing radiation followed by imbibing with one or more grafting monomer, then a second exposure to an ionizing radiation and a second imbibing after the second exposure to the ionizing radiation).

It will be further understood that the grafting process will yield a radical species on the surface of the nonwoven substrate. After imbibing with the monomer solution, polymerization will initiate with the formation of a radical on the carbon alpha to the carbonyl of the anionic monomer of Formulas I or II, that may further polymerize with one of more additional anionic monomers such as the aminoalkyl (meth)acryloyl monomers of Formula II, one of more optional PEG monomers of Formula III, and one or more optional second hydrophilic monomers, resulting in a grafted polymers having these groups pendent from the polymer chain as simply illustrated below.

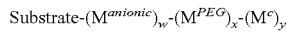

Substrate-$(M^{anionic})_w$-$(M^{PEG})_x$-$(M^c)_y$

In the formula, the -$(M^{anionic})_w$- represent the residue of the grafted anionic monomers of Formulas I and II having "w" polymerized monomer units where w is at least 2, the -$(M^{PEG})_x$ represents the polymerized monomer of Formula III having "x" polymerized monomer units, where x may be zero and is preferably at least one, -$(M^c)_y$ represents the polymerized second hydrophilic monomers, having y polymerized monomer units, where y may be zero and is preferably at least 1. The polymer may be random or block. The polymer may be directly grafted via the residue of the aminoalkyl (meth)acryloyl monomer, as shown, or may be directly grafted via the -$(M^{PEG})$- monomers or the hydrophilic monomers, as described herein.

The values of the subscripts w, x and y may be an integral or non-integral value and correspond to the amount of each monomer in the imbibing solution previous described. For example, the value of the subscript "w" will correspond to an amount of 70 to 100 wt. % of anionic monomers in the imbibing solution, the value of subscript x will correspond to 0 to 20 wt. %, preferably 2 to 20 wt. % of the monomers of Formula III and the value of subscript y will correspond to 0 to 10 wt. % of second hydrophilic monomers.

The process of preparing the grafted nonwoven substrate comprises the steps of providing a nonwoven substrate, exposing the nonwoven substrate to ionizing radiation in an inert atmosphere, and subsequently imbibing the exposed substrate with a solution comprising anionic monomers (and optionally other monomers, as described) to graft polymerize said monomers to the surface of the nonwoven substrate.

In the first step the nonwoven substrate is exposed to ionizing radiation, such as e-beam radiation, in an inert atmosphere. Generally, the substrate is placed in a chamber purged of oxygen. Typically, the chamber comprises an inert atmosphere such as nitrogen, carbon dioxide, helium, argon, etc., with a minimal amount of oxygen (less than 100 ppm), which is known to inhibit free-radical polymerization.

The irradiation step comprises the ionizing irradiation of nonwoven substrate surfaces, preferably with ionizing e-beam or gamma radiation to prepare free radical reaction sites on such surfaces upon which the monomers are subsequently grafted. "Ionizing irradiation" means radiation of a sufficient dosage and energy to cause the formation of free radical reaction sites on the surface(s) of the base substrate.

Ionizing radiation may include gamma, electron-beam, x-ray and other forms of electromagnetic radiation. In some instances, corona radiation can be sufficiently high energy radiation. The radiation is sufficiently high energy, that when absorbed by the surfaces of the base substrate, sufficient energy is transferred to that support to result in the cleavage of chemical bonds in that support and the resultant formation of free radical sites on the nonwoven substrate. One or more layers of nonwoven substrates may be subjected to the ionizing radiation.

High energy radiation dosages are measured in units of kilogray (kGy). Doses can be administered in a single dose of the desired level or in multiple doses which accumulate to the desired level. Dosages can range cumulatively from about 1 kGy to about 200 kGy. The dose can be delivered all at once such as from an E-beam source or accumulated from a slow dose rate over several hours such as dosage delivered from a gamma source. Preferably, the cumulative dosage exceeds 20 kGy (2 Mrads) for substrates resistant to radiation damage.

Electron beam is one preferred method of grafting due to the ready-availability of commercial sources. Electron beam generators are commercially available from a variety of sources, including the ESI "ELECTROCURE" EB SYSTEM from Energy Sciences, Inc. (Wilmington, Mass.), and the BROADBEAM EB PROCESSOR from PCT Engineered Systems, LLC (Davenport, Iowa). For any given piece of equipment and irradiation sample location, the dosage delivered can be measured in accordance with ASTM E-1275 entitled "Practice for Use of a Radiochromic Film Dosimetry System." By altering extractor grid voltage, beam diameter and/or distance to the source, various dose rates can be obtained.

In the irradiation step the nonwoven substrate is exposed to a sufficient quantity of ionizing radiation, so as to form free radicals on the surfaces of the nonwoven substrate. The chamber may contain at least one device capable of providing a sufficient dose of radiation. A single device is capable of providing a sufficient dose of radiation, although two or more devices, and/or multiple passes through a single device, may be used especially for relatively thick nonwoven substrates. The environment containing the nonwoven substrate comprises an inert atmosphere such as nitrogen, carbon dioxide, helium, argon, etc., with a minimal amount of oxygen, which is known to inhibit free-radical polymerization.

Dose is the total amount of energy absorbed per mass unit. Dose is commonly expressed in units of kiloGray (kGy). A gray is defined as the amount of radiation required to supply 1 joule of energy per kilogram of mass. The total dose received by the substrate depends on a number of parameters including source activity, residence time (i.e., the total time the sample is irradiated), the distance from the source, and attenuation by the intervening cross-section of materials between the source and sample. Dose is typically regulated by controlling residence time, distance to the source, or both.

Generally, it was found that doses in the range of about 20 to 40 kGy were suitable for generating the grafted hydrogel polymer. Total dose requirement for any given composition will vary as a function of desired grafting objectives, monomer selected, substrate used and the dose rate. Thus, a dose rate can be selected based on desired properties for a specified composition. The dose rate is typically in the range of 0.0005 kGy/sec (gamma) to 200 kGy/sec (E-beam).

Other sources of irradiation may be used with equal grafting performance; a desirable source of ionizing radiation comprises an electron beam source because the electron beam can produce high and fast dose delivery rates. Electron beams (e-beams) are generally produced by applying high voltage to tungsten wire filaments retained between a repeller plate and an extractor grid within a vacuum chamber maintained at about $10^{-6}$ Torr. The filaments are heated at high current to produce electrons. The electrons are guided and accelerated by the repeller plate and extractor grid towards a thin window of metal foil. The accelerated electrons, traveling at speeds in excess of $10^7$ meters/second (m/sec) and possessing about 100 to 300 kilo-electron volts (keV), pass out of the vacuum chamber through the foil window and penetrate whatever material is positioned immediately beyond the foil window.

The quantity of electrons generated is directly related to the current. As extractor grid voltage is increased, the acceleration or speed of electrons drawn from the tungsten wire filaments increase. E-beam processing can be extremely precise when under computer control, such that an exact dose and dose rate of electrons can be directed against the nonwoven substrate.

The temperature within the chamber is desirably maintained at an ambient temperature by conventional means. Without intending to be limited to any particular mechanism, it is believed that the exposure of the nonwoven substrate to an electron beam results in free radical sites on the substrate surface which can then subsequently react with the grafting monomers in the imbibing step.

The total dose received by the nonwoven substrate primarily affects the number of radical sites formed on the surface thereof and subsequently the extent to which the grafting monomers are grafted onto the nonwoven substrate. Dose is dependent upon a number of processing parameters, including voltage, web- or line-speed and beam current. Dose can be conveniently regulated by controlling line speed (i.e., the speed with which the nonwoven substrate passes under the irradiation device), and the current supplied to the extractor grid. A target dose (e.g., <10 kGy) can be conveniently calculated by multiplying an experimentally measured coefficient (a machine constant) by the beam current and dividing by the web speed to determine the exposure. The machine constant varies as a function of beam voltage.

While the controlled amount of electron beam radiation exposure is dependent upon the residence time, the nonwoven substrate is subjected to a controlled amount of dosage ranging from a minimum dosage of about 1 kilogray (kGy) to a practical maximum dosage of less than about 200 kGy, depending on the particular polymer. For radiation sensitive polymers such as propylene polymers the amount typically ranges from a minimum dosage of about 1 kilogray (kGy) to a maximum dosage of less than about 10 kGy. Typically, the total controlled amount of dosage ranges from less than about 9 kGy to about 7 kGy for propylene polymers to avoid degradation. Less radiation sensitive polymers such as nylons or PVDF may be subjected to higher dosages, typically 10 to 70 kGy. Generally, suitable gamma ray sources emit gamma rays having energies of 400 keV or greater. Typically, suitable gamma ray sources emit gamma rays having energies in the range of 500 keV to 5 MeV. Examples of suitable gamma ray sources include cobalt-60 isotope (which emits photons with energies of approximately 1.17 and 1.33 MeV in nearly equal proportions) and cesium-137 isotope (which emits photons with energies of approximately 0.662 MeV). The distance from the source can be fixed or made variable by changing the position of the target or the source. The flux of gamma rays emitted from the source generally decays with the square of the distance from the source and duration of time as governed by the half-life of the isotope.

In the instant method, the irradiated substrate, having free radical sites on the surface of the nonwoven substrate, are imbibed with the monomer solution subsequent to and not concurrent with, the irradiation step. The free radical sites generated on the surface of the nonwoven substrate have average lifetimes ranging from several minutes to several hours and progressively decay to a low concentration within about ten hours at room temperature. Lower temperatures, such as dry ice temperatures, promote longer radical lifetimes. Alternatively, humidification and nitrous oxide can increase the rate of substrate radical formation via generation of hydroxyl radicals. The effective binding absorption capacity of the grafted nonwoven from the graft polymerization process is little changed after a reaction time of about 12 hours, when kept under inert conditions. It has been observed that keeping the graft polymerization process inert for 72 hours results in an increase of about 10 to 20% more binding capacity (as described in the Example) than the performance of a sample quenched after 12 hours (by exposure to air) at room temperature, presumably due to an increase in grafted polymer.

Generally, the irradiated nonwoven substrate is imbibed with the monomer solution immediately after the irradiation step. Generally when using E-beam the irradiated substrate is imbibed within an hour, preferably within ten minutes. Generally, when using gamma as a source, the substrate should be imbibed immediately after irradiation since irradiation residence time will be long. It has been observed that if the substrate is irradiated by ionizing radiation in the presence of the grafting monomers, the filtration performance of the grafted nonwoven substrate is inferior to that article prepared by the instant method.

In the imbibing step, the nonwoven substrate is contacted with the imbibing solution containing one or more grafting monomers and in amounts previously described. Suitable methods of imbibing include, but are not limited to, a spray coating, flood coating, knife coating, Meyer bar coating, dip coating, and gravure coating.

The imbibing solution remains in contact with the nonwoven substrate for a time sufficient for the radical sites to initiate polymerization with the grafting monomers. When imbibed with a solution of monomers, grafting reactions are mostly completed after 12 hours exposure; generally resulting in about 50+ percent conversion of monomers to grafted polymer. As a result, the nonwoven substrate comprises grafted polymers and/or copolymers attached to the interstitial and outer surfaces of the nonwoven substrate.

As discussed above, the imbibing solution may comprise one or more grafting monomers suitable for grafting onto surfaces of the nonwoven substrate. Any of the exemplary grafting monomers described above can be included in the imbibing solution. In addition to the described grafting monomers, the imbibing solution can contain other materials such as, for example, one or more other non-grafting monomers for UV curing, surfactants, dyes, pigments and solvents.

The concentration of each grafting monomer in the imbibing solution may vary depending on a number of factors including, but not limited to, the grafting monomer or monomers in the imbibing solution, the extent of grafting desired, the reactivity of the grafting monomer(s), and the solvent used. Typically, the total concentration of the monomers in the imbibing solution ranges from about 1 wt % to about 100 wt %, desirably, from about 5 wt % to about 30 wt %, and more desirably from about 15 wt % to about 25 wt % based on a total weight of the imbibing solution.

The imbibing solution further comprises an aqueous blend of a water miscible organic solvent and the grafting monomer(s). It has been found that the solvent blend influences the morphology of the grafted polymer and the resulting flux rate when used in separation applications. The ratio of water to organic solvent can vary widely, but is typically greater than 1:1 (v/v) water to organic solvent, preferably greater than 5:1, and more preferably greater than 7:1. The ratios are generally adjusted so that the resulting grafted nonwoven substrate produces pressure and flux responses maximizing the binding capacity for the targeted bioseparation application.

The concentration of the organic solvent in water may be optimized with respect to the fiber size of the nonwoven substrate. In general, the optimum concentration of organic solvent increases as the fiber size decreases. Using a 20% 2-Acrylamido-2-methylpropanesulfonic acid, ammonium or sodium salts (AMPS) monomer imbibing solution, a nonwoven with a 4 μm effective fiber diameter optimally uses 15% or less organic solvent in water. A 15% 2-Acrylamido-2-methylpropanesulfonic acid, ammonium or sodium salts monomer imbibing solution for a 1 μm effective fiber diameter nonwoven web optimally uses more than 15% organic solvent in water.

It is believed that by adjusting the amount of water miscible organic solvent in the imbibing solution a greater amount of monomer is grafted to the nonwoven substrate without bridging the fibers of the substrate and closing the voids. If the web voids are bridged, the nonwoven dries to a translucent appearance, and has decreased flux and reduced ability to expand on hydration. The smaller the fibers the less monomer it takes to bridge the pores of the nonwoven. Adding more water-miscible organic solvent reduces the bridging, allows for increased grafted polymer content (as a function of weight percent of the nonwoven substrate) and allows for freer expansion of the article.

Any such water miscible organic solvent preferably has no tertiary hydrogen atoms, or other groups that would retard the graft polymerization. In some embodiments, the water miscible solvents are protic group containing organic liquids such as the lower alcohols having 1 to 4 carbon atoms, lower glycols having 2 to 6 carbon atoms, and most preferably lower glycol ethers having 3 to 6 carbon atoms and 1 to 2 ether linkages. In some embodiments higher glycols such as poly (ethylene glycol) may be used. Specific examples are methanol, ethanol, n-butanol, t-butyl alcohol, ethylene glycol, methoxyethanol, ethoxyethanol, propoxyethanol, butoxyethanol, methyl carbitol, ethyl carbitol, and mixtures thereof.

In other embodiments, non-protic water miscible organic solvents that can also be used such as aliphatic esters and ketones and sulfoxides such as ethyl acetate, propyl acetate, butyl acetate, methoxyethyl acetate, ethoxyethyl acetate, propoxyethyl acetate, butoxyethyl acetate, triethyl phosphate, acetone, methyl ethyl ketone, methyl propyl ketone and dimethyl sulfoxide.

Once the nonwoven substrate has been imbibed for a desired period of time, the nonwoven substrate bearing grafted polymer groups may be optionally rinsed to remove residual monomer and/or dried.

In the optional rinsing step, the functionalized nonwoven substrate is washed or rinsed one or more times to remove any unreacted monomers, solvent or other reaction by-products. Typically, the functionalized substrate is washed or rinsed up to three times using a water rinse, an alcohol rinse, a combination of water and alcohol rinses, and/or a solvent rinse (e.g., acetone, methyl ethyl ketone, etc). When an alcohol rinse is used, the rinse may include one or more alcohols including, but not limited to, isopropanol, methanol, ethanol, or any other alcohol that is practical to use and an effective solvent for any residual monomer. In each rinse step, the functionalized substrate may pass through a rinse bath or a rinse spray. In some embodiments, the rinse may comprise an ionic buffer solution that would reduce swelling of the hydrogel, the amount of retained water, and also avoiding weakening the non-woven substrate during this rinse step.

In the optional drying step, the functionalized substrate is dried to remove any rinse solution. Typically, the functionalized substrate is dried in oven having a relatively low oven temperature for a desired period of time (referred to herein as "oven dwell time"). Oven temperatures typically range from about 60° C. to about 120° C., while oven dwell times typically range from about 120 to about 600 seconds. Any conventional oven may be used in the optional drying step. It should also be noted that in other embodiments the drying step can proceed before the rinsing step to eliminate volatile components before extraction of non-grafted residue. Following the optional drying step, the dried functionalized substrate can be taken up in roll form to be stored for future use The functionalized nonwoven substrates are particularly suited as filter media, such as the filter media found in water filtration devices. As the polymer is grafted to render it hydrophilic, the filter media is durable. The hydrophilic porous substrate described herein, can be cleaned or flushed and retain the hydrophilic properties as evidenced by the surface energy and wettability.

When used in a filtration application, one or more layers of the functionalized substrate may be used, each of which layers may have the same, or different average fiber size, void volume, degree of polymer grafting, monomer composition of grafted polymer, porosity, tensile strength and surface area. In some embodiments, each subsequent layer may have a smaller effective pore size or smaller average fiber size so that finer contaminants may be filtered. The grafted nonwoven substrate may be configured as planar or lenticular disks. In some embodiments the nonwoven substrate may be pleated. Pleated grafted nonwoven filter elements may be combined as multiple concentric pleated elements. The grafted nonwoven substrate may be wound spirally. Further, the grafted nonwoven substrate may be encapsulated with a porous web to provide support and aid in handling. In filtration applications, the nonwoven may be disposed either vertically, or horizontally.

FIG. 1 depicts an exemplary filter media 120 according to the present disclosure. As shown, filter media 120 comprises a plurality of pleats 126. In some embodiments, pleated filter media 120 may be incorporated into a filter device or other filter device. Examples of pleating configurations and filter devices comprising pleated media may be found, for example, in U.S. Pat. No. 6,521,011 to Sundet et al., the disclosure of which is hereby incorporated by reference in its entirety. It is also envisioned that the plurality of pleats 126 could comprise planarly disposed pleats, as described in U.S. 2001-0226691 (Lucas et al.), the disclosure of which is hereby incorporated by reference in its entirety. In the embodiment shown, filter media 120 comprises a grafted nonwoven substrate 122 together with a microporous membrane layer 124. Typically, microporous membrane layer 124 is positioned downstream of grafted nonwoven substrate 122.

Microporous membrane layer 124 may comprise one or more microporous membranes as described throughout the present disclosure. In some embodiments, microporous membrane layer 124 comprises a single zone having a symmetrically distributed pore size. In other embodiments, microporous membrane layer 124 comprises a single zone comprising an asymmetrically distributed pore size. In still other embodiments, microporous membrane layer 124 comprises multiple discrete zones. In such embodiments, each discrete zone may comprise symmetrically or asymmetrically distributed pore sizes.

In some embodiments, one or more zones of microporous membrane layer 124 may be functionalized to include, for example, enhanced hydrophilic properties. Methods for providing a functionalized microporous membrane are described, for example, elsewhere in the present disclosure.

It is also envisioned that microporous membrane layer 124 may comprise multiple layers of microporous membrane, wherein each layer may comprise a single zone or multiple discrete zones. Each zone may comprise symmetrically or asymmetrically distributed pore sizes, and each layer of microporous membrane may be functionalized or non-functionalized as desired for a specific application. In one embodiment, as described below in the section entitled "Nylon Microporous Membranes D1-D6", microporous membrane layer 124 may comprise three layers of microporous membrane, wherein each layer comprises three discrete zones.

Grafted nonwoven substrate 122 may comprise one or more nonwoven substrates as described throughout the present disclosure. In some embodiments, grafted nonwoven substrate 122 comprises a single layer of nonwoven. In other embodiments, grafted nonwoven substrate 122 may include additional layers of nonwoven material having the same or different construction. For example, it is envisioned that grafted nonwoven substrate 122 may comprise a non-grafted nonwoven layer positioned upstream of a grafted nonwoven layer. In such an embodiment, the more upstream layer may be provided, for example, with a lower density, or increased porosity, relative to the more downstream layer.

Figure 2:
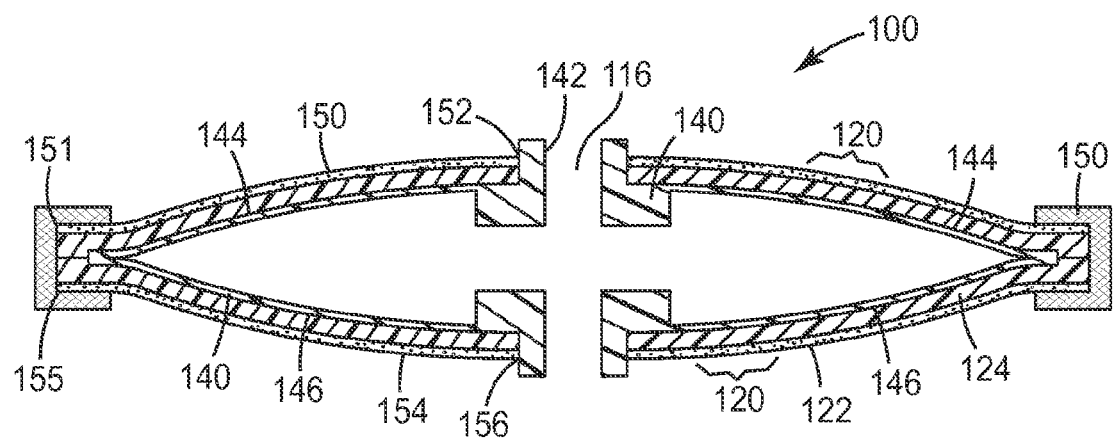
FIG. 2 is a cross-sectional view of an exemplary filter device provided in lenticular form and comprising a filter media according to the present disclosure.

FIG. 2 depicts an exemplary filter device 100 according to the present disclosure. As shown, filter device 100 comprises a filter media 120 provided in the form of a lenticular filter cartridge. Examples of lenticular filter cartridges and methods of making lenticular filter cartridges may be found, for example, in U.S. Pat. Nos. 6,464,084; 6,939,466; 7,178,676; and 6,712,966 to Pulek et al., the disclosures of which are hereby incorporated by reference in their entirety.

As shown, filter device 100 comprises a separator element 140 having a central core 142 in fluid communication with a fluid outlet 116. Typically, separator element 140 comprises a first side 144 and a second side 146 upon which filter media 120 may be disposed. First side 144 and second side 146 are typically not provide filtering functionality, but are provided with a network of apertures through which fluid may freely flow. As depicted, filter media 120 is provided as a first filter media disk 150 positioned on first side 144 and a second filter media disk 154 positioned on second side 146. First and second filter media disks 150 and 154 each respectively comprise an outer circumferential edge 151, 155 and an inner circumferential edge 152, 156. In some embodiments, an edge seal 150 connects the outer circumferential edges 151 and 155 of first and second filter media disks 150 and 154. Typically, inner circumferential edges 152 and 156 are connected to central core 142 of separator element 140.

In a typical application, the downstream surface of filter media 120 is positioned proximal to separator element 140. Filter media 120 comprises grafted nonwoven substrate 122. In the embodiment shown, filter media 120 comprises a grafted nonwoven substrate 122 together with a microporous membrane layer 124. Typically, microporous membrane layer 124 is positioned downstream of grafted nonwoven substrate 122.

Figure 3:
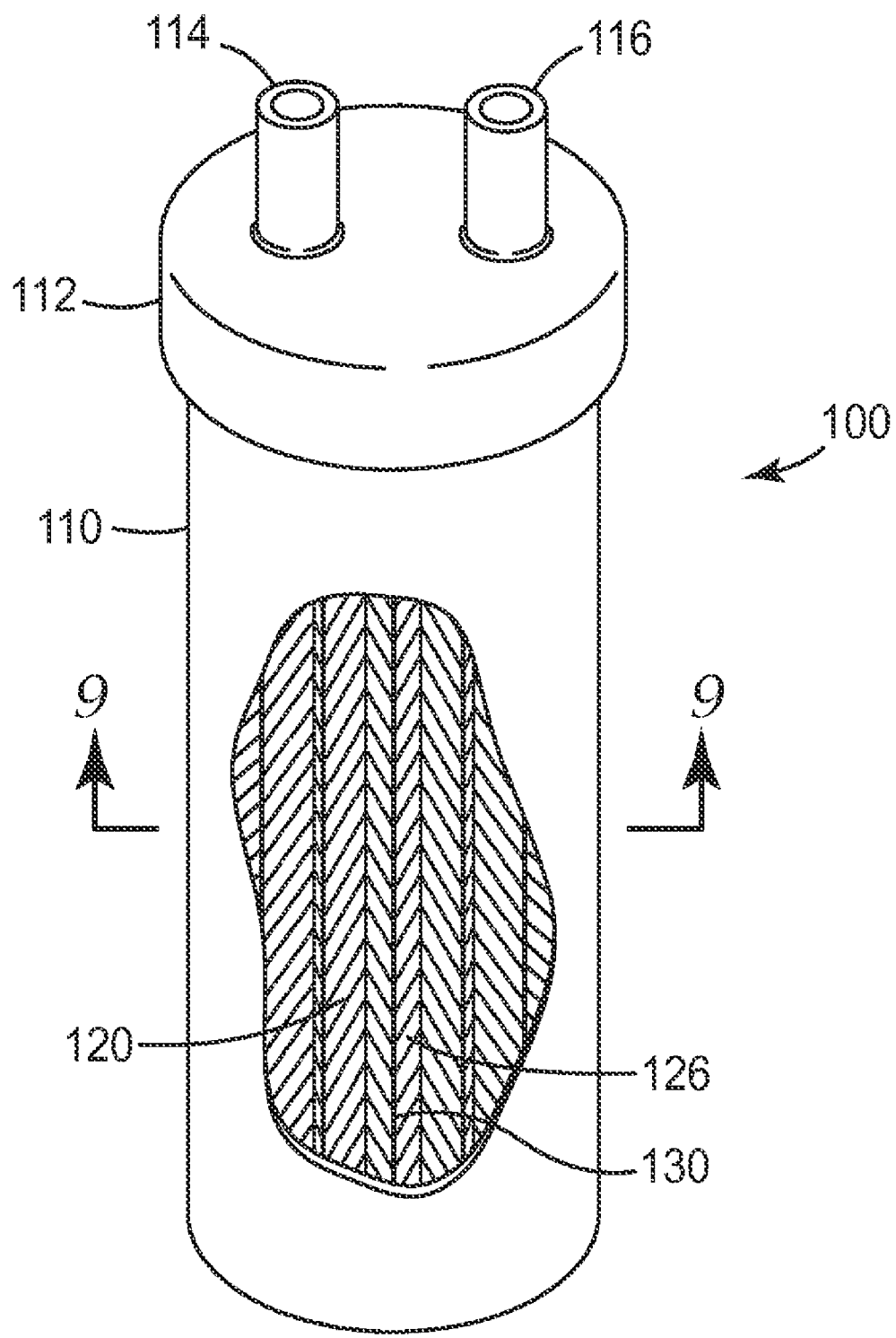
FIG. 3 is a perspective and partial cutaway view of an exemplary filter device provided in encapsulated form and comprising a filter media according to the present disclosure.

With regard to FIG. 3, an exemplary filter device 100 is shown comprising a filter capsule 110 and a filter cap 112 connected to filter capsule 110. As shown, filter cap 112 comprises a fluid inlet 114 and a fluid outlet 116. Filter media 120 is encapsulated in filter capsule 110 and fluidly connects fluid inlet 114 and fluid outlet 116. As seen through the cutaway in FIG. 8, filter media 120 is formed into a first media cylinder 130 comprising a plurality of pleats 126. Examples or filter devices and methods of making filter devices may be found, for example, in U.S. Pat. No. 6,458,269 to Bassett et al., the disclosure of which is hereby incorporated by reference in its entirety. Examples of filter media formed into cylinders comprising a plurality of pleats may be found, for example, in U.S. Pat. No. 6,315,130 to Olsen, the disclosure of which is hereby incorporated by reference in its entirety.

In some embodiments the present disclosure provides a filter cartridge comprising a filter capsule; and a filter cap connected to the filter capsule; wherein the filter cap comprises the fluid inlet and the fluid outlet, and wherein the filter media is encapsulated in the filter capsule. In some embodiments filter cap of the filter device comprises the fluid inlet and the fluid outlet, and wherein the filter media is encapsulated in the filter capsule. In some embodiments the filter media further comprises a microporous membrane layer positioned downstream of the grafted nonwoven substrate.

Figure 4:
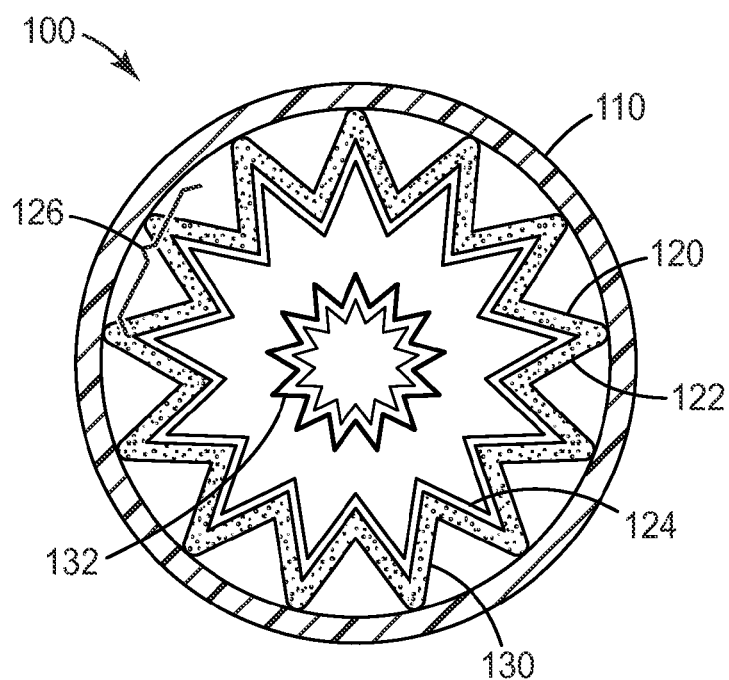
FIG. 4 is a cross-sectional view taken at 9-9 of FIG. 3 of an exemplary filter device provided in encapsulated form and comprising a first pleated media cylinder and a second pleated media cylinder according to the present disclosure.

Therefore the present disclosure provides a filter device comprising a fluid inlet; a fluid outlet; and a filter media fluidly connecting the fluid inlet and the fluid outlet; wherein the filter media comprises the grafted nonwoven substrate. In some embodiments the present disclosure provides a filter device further comprising a separator element (140); and an edge seal (150); the separator element comprising a central core (142) in fluid communication with the fluid inlet; a first side (144); and a second side (146); the filter media comprising a first media disk (150) positioned on the first side of the separator element and having an outer circumferential edge (151) and an inner circumferential edge (152); and a second media disk (154) positioned on the second side of the separator element and having an outer circumferential edge (155) and an inner circumferential edge (156); wherein the outer circumferential edges of the first and second media disks are connected by the edge seal and the inner circumferential edges of the first and second media disks are connected to the central core FIG. 4 depicts a cross-sectional view of one embodiment of filter device 100 shown in FIG. 3, wherein filter media 120 is formed into first media cylinder 130 comprising a plurality of pleats 126. In the embodiment shown, filter media 120 comprises a grafted nonwoven substrate 122 together with a microporous membrane layer 124. Typically, microporous membrane layer 124 is positioned downstream of grafted nonwoven substrate 122. As shown in FIG. 4, filter device 100 optionally comprises a second media cylinder 132 positioned within first media cylinder 130. In such embodiments, second media cylinder 132 may comprise a plurality of pleats. Examples of filter modules comprising inner and outer media cylinders comprising a plurality of pleats may be found, for example, in U.S. Pat. Pub. No. U.S. 2009/0020472 A1 to Lucas et al., the disclosure of which is hereby incorporated by reference in its entirety.

Therefore in some embodiments, the present disclosure provides a filter device of wherein the filter media further comprises one or more microporous membrane layers positioned downstream of the grafted nonwoven substrate. In some embodiments the present disclosure provides a filter device wherein the filter media comprises a plurality of pleats.

Figure 5:
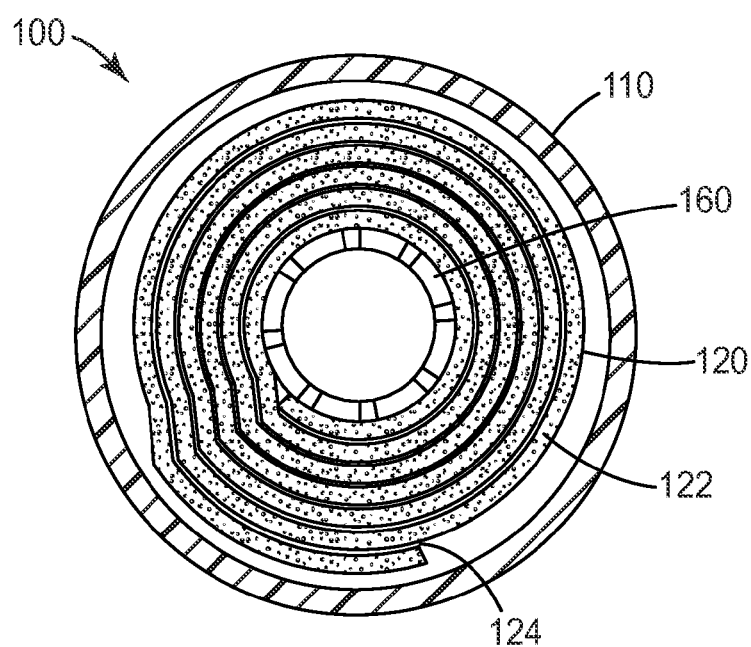
FIG. 5 is a cross-sectional view taken at 9-9 of FIG. 3 of an exemplary filter device provided in encapsulated form and comprising a core wherein a filter media according to the present disclosure is spirally wound about the core.

FIG. 5 depicts a cross-sectional view of an alternative embodiment of a filter device 100 as shown in FIG. 3, wherein filter device further comprises a core 160, and wherein the filter media 120 is spirally wound about core 160. Core 160 typically does not provide filtering functionality, but is provided with a network of apertures through which fluid may freely flow. Examples of spirally wound filter cartridges and methods of making spirally wound filter cartridges may be found, for example, in U.S. Pat. No. 6,391,200 to Pulek et al., the disclosure of which is hereby incorporated by reference in its entirety. In the embodiment shown, filter media 120 comprises a grafted nonwoven substrate 122 together with a microporous membrane layer 124. Typically, microporous membrane layer 124 is positioned downstream of grafted nonwoven substrate 122. In some embodiments, a drainage layer may be further provided to help facilitate fluid flow between adjacent layers of spirally-wrapped filter media 120.

In some embodiments the present disclosure provides a filter device comprising a core (160), wherein the filter media is spirally wound about the core.

In some embodiments the functionalized nonwoven substrate may be combined with conventional filter elements, such as microporous membranes. In particular, a filter comprising one or more layers of the instant functionalized nonwoven substrate can serve as a filter for removing contaminants downstream of a Protein A column.

A microporous membrane with an absolute pore size rating used in conjunction beneath the media is desirable because the functionalized nonwoven substrate will protect the microporous membrane, thereby extending the useful life of the microporous membrane, and in turn, the membrane will capture any breakthrough contamination from the open hydrogel network permitting a longer useful life of the grafted nonwoven (as measured by turbidity reduction of the filtrate).

When used in filtration, a fluid containing a biological sample of interest and contaminants can be passed through the responsive functionalized nonwoven article separating the two. In some embodiments contaminates will be retained in the grafted polymer hydrogel network and the biological sample of interest will pass. In other embodiments biological product will be retained in the grafted polymer hydrogel network and contaminants will pass. The interstitial pores or voids of the grafted polymer hydrogel may be changed in response to the biological contamination of the fluid or the presence of a "trigger", (e.g., ionic strength, polar organic or inorganic species, molasses, salt, buffer, proteins, cell debris, viruses, etc). It is observed that the clean water flux (with no trigger) is low with high back pressure. Increased hydraulic pressure causes the hydrogel to collapse or compress further reducing flux. This collapse or compression further shortens the dwell time by decreasing the z direction mean flow path and reducing the retaining volume for accumulating biocontaminants. Therefore, the grafted nonwoven works better at low pressures thereby reducing shear to any shear sensitive proteins during the early filtration steps.

The polymer grafted nonwoven article described herein is capable of retaining particles and insoluble contaminates from a biological fluid phase throughout its expanded matrix. When some small amount of polar "trigger" is present the hydraulic pressure is rapidly relieved. It is believed that each anionic monomer unit serves as a point charge in the grafted polymer chain, and is surrounded by an ionic electric double layer entirely composed of water, the hydration layer. This forms a "radius of shear" resisting water flux and serves to compress the nonwoven hydrogel network from the hydraulic pressure. Small ionic differences cause disruption of the inner and outer shell of the double layer allowing increased flux. During filtration when the back pressure is relieved after exposure to a "trigger", the nonwoven structure can expand back because of the lack of hydraulic pressure.

In filtration applications, naturally occurring macromolecules such as proteins acquire a charge when dispersed in water—due to the pKa of the protein and the pH of the buffered solution and the filter can be run in either capture or flow through modes. For example, positively charged cell debris or host cell proteins are bound by charge-affinity to the negatively charged hydrogel, allowing passage of such entities as neutrally charged monoclonal antibodies (mAb). Adjusting the pH below the isoelectric point (pI) of the desired protein it will take a positive charge and be retained in the hydrogel network. As more and more material is progressively passed through the depth of the filter, the discontinuous gel collapses as positively charged contaminates or product is captured and negatively charged materials are passed. This continues until the dynamic capacity of the filter element is reached.

In biofiltration applications, high filtration pressure is undesirable because it could result in the shearing and subsequent denaturing of the proteins. Excessive pressure generated from pumping clean water can cause the expanded nonwoven to collapse under hydraulic pressure making flow even more restrictive and undesirable because it shortens affinity dwell time by decreasing the z direction mean flow path and reduces the retaining volume for accumulating biocontamination. Hence, the article of this invention becomes capable of retaining particles and insoluble contaminates from a mobile phase throughout its expanded matrix at lower filtration pressures.

The instant polymer-functionalized nonwoven article will load contamination without undue pressure build-up over the lifetime of the article. A normal fouling mechanism in filter media is when the media sifts particles out of a mobile phase; the particles can cake in the pores or on the major surface of the media. Flux is then reduced and pressure builds up and this can be exacerbated if the cake layer can be compressed. The instant polymer-functionalized nonwoven article allows contamination to impinge on the discontinuous hydrogel matrix where the contamination easily is diffused into the matrix resisting fouling from caking or compression. As contamination is added, more room is obtained in the interstitial spaces of the nonwoven from the loading and adsorption of contamination on the hydrogel polymer tendrils.

In bioseparation applications, generally "normal flow" filtration is conducted in either a constant rate or constant pressure mode. In constant rate mode, a set volume of fluid is delivered from a pump and the pressure in a filter is allowed to increase as the filter fouls and the filtering process is stopped at a nominal pressure value to keep the target protein intact; usually to no more than about 30 psi. In constant pressure mode a set pressure is applied to a fluid and allowed to flow until the delivery rate ceases or becomes to low to be practical and the filtration process is stopped. Typical flow rates used in affinity chromatography from low to high are about 50 to 600 LMH (liters/(meter$^2$-hour), or a frontal fluid velocity of 0.08 to 1 ml/(min-cm$^2$). 47 mm test housings have about 13 cm$^2$ of usable surface area so a rate of 13 ml/min is equivalent performance to the stated high 600 LMH used in commercial procedures. Depending on the number of layers, thickness of each layer, fiber size and amount of grafting, the clean water flux of this invention has been observed as high as 75 psi at 1 ml/(min-cm$^2$) (13 ml/min). The introduction of a polar trigger will cause this pressure to be reduced to less than 1 psi. Flushing out the buffer (serving as a trigger) with clean water results in returning of the higher pressures.

The polymer grafted nonwoven substrate described herein may be combined with microporous membranes, including symmetric or asymmetric microporous membranes (having a gradient porosity), and single or multiple layers of such membranes. Useful microporous membranes include those made from nylon, polyether sulfone, polyvinylidine fluoride, polypropylene, ethylene-trichlorofluoroethylene, with single layer, multiple layers, and the like. Preferably, these membranes are hydrophilic. The microporous membranes may have symmetric pore size ranges of 0.01 to 150 µm, preferably 0.1 to 100 µm and thicknesses of 25 to 500 µm. In another embodiment the grafted nonwoven substrate may be combined with asymmetric microporous membranes having gradient average pore sizes of 0.01 to 150 µm. In other embodiments, multiple layers of microporous membranes may be used in combination, with each layer having successively finer porosity, such from 15 to 0.02 µm, preferably 10 to 0.8 µm and total thicknesses of 75 to 1200 µm. Multiple layers of microporous membranes having both symmetric and gradient porosities may be used in combination. Further, the microporous membranes may be polymer grafted to alter the surface characteristics thereof, such as hydrophilicity, hydrophobicity or charge binding capacity.

Further, one or more layers of the grafted nonwoven substrate may be combined with one of more layers of a microporous membrane. For example one to six layers of grafted nonwoven substrate may be combined with the microporous layer(s). Each layer of the grafted nonwoven substrate may be the same or different. In some embodiments the layers may be the same, or may differ in terms of the particular nonwoven substrate, thickness of the nonwoven substrate, polymer used therein, fiber size, porosity, void volume, loft, tensile strength, surface area, grafting weight or density, degree of polymer grafting, and/or monomer concentration in the grafting polymer.

Examples of useful commercial membrane include Life-Assure™ or SterAssure™ cast nylon microporous membranes available from CUNO Inc., Meriden, Conn. Useful microporous membranes are disclosed in U.S. Pat. Nos. 6,413,070, 6,513,666, 6,776,940, 6,056,529 and 6,264,044 (Meyering et al.,), U.S. Pat. No. 5,006,247 (Dennison et al.), U.S. Pat. No. 3,876,738 (Marinaccio et al.), U.S. Pat. No. 4,707,265, (Barnes et al.), and U.S. Pat. No. 4,473,474 (Ostreicher et al.), each incorporated by reference. Useful graft polymer functionalized microporous membranes are disclosed in U.S. 2010/0261801 (Weiss et al.), and incorporated herein by reference.

The combination of the microporous membranes with the grafted nonwoven will protect the microfiltration membrane thereby extending its useful life and the membrane will capture any breakthrough contamination that passes through the open hydrogel network improving the efficiency of the grafted nonwoven. Contaminants may be measured using techniques known in the art including turbidity reduction, UV, DNA quantitation and ELISA methods.

The article provides a high media packing density in an adsorptive depth-type filter module which provides improved filtration efficiency. The article further provides increased surface area for a given media mass in an adsorptive depth-type filter module which provides higher flow rate (flux). Typically there is a trade-off between achieving these desirable filter characteristics of high efficiency and high flux. However the present functionalized nonwoven substrate provides a depth-type filter module that has high media packing density without sacrificing flux.

It is believed that the polymer functionalized nonwoven substrate functions predominately by adsorption, diffusion, and impingement mechanisms and is therefore different from conventional membrane filters which operate by a combination of size exclusion, trapping and adsorption. The advantage of the instant grafted nonwoven as a pre-layer is that the pre-layer is fully utilized throughout it's depth with a range of contaminant species. A conventional filter, which operates by trapping and size exclusion, will inevitably plug and lacks the depth of the media and contaminate holding network to prevent or delay fouling.

EXAMPLES

Unless otherwise noted, all parts, percentages, ratios, etc., in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

The following preparations, solutions and test procedures were used to evaluate polymer grafted nonwoven substrates.
Preparation 1: Nylon Nonwoven Substrate A.

B-24K™ nylon-6 polymer (BASF Corporation Engineering Plastics Wyandotte, Mich.) was used to produce meltblown nonwoven substrate. The melt temperature was 295° C. with a mass flow rate of 0.25 grams/hole/minute on a standard meltblowing drilled orifice die. Hot air at 350° C. and 975 cubic feet per minute (SCFM) (27.8 cubic meters per minute (CMM)), per meter of die width, was used to attenuate the fibers. The fibers with a face velocity at impact of 1200 meters per minute (m/min) were collected 0.30 meters from the die on a foraminous stainless steel belt and were bonded under 200° C. air drawn through the web at a face velocity of 137 m/min for 0.14 seconds, followed by cooling air at 29° C., at the same face velocity, for 0.8 seconds. The collected web basis weight was 48 grams per square meter and had an effective fiber diameter of 4.1 µm. The collected web had a thickness of 0.4 mm before calendaring between two 25 cm diameter smooth steel rolls set at 82° C., running at 1.5 m/min with a nip pressure of 170 Newtons per lineal centimeter of web (N/lcm). The resulting web thickness was 0.25 mm.
Preparation 2: Nylon Microporous Membranes.

A nine zone, reinforced asymmetric microporous nylon membrane was prepared using the process described in U.S. Pat. No. 6,776,940 (Meyering et al.). As described, a single base polymer dope formulation was split into three parts and applied to a three-way thermal manipulation apparatus. The dope formulation was heated to three different temperatures to achieve three distinct zones. Each of the temperatures used was selected to produce pore sizes in each zone for forming an asymmetric microporous membrane. The first zone (upper zone) had the largest pore size, the second (middle) zone had an intermediate pore size and the third zone (lower zone) had the smallest pore size. The membrane was a single layer having three consecutive progressively smaller pore size exclusion zones.

The nine-zone asymmetric microporous membrane was prepared by laminating three three-zone asymmetric microporous membranes. A first microporous membrane (top layer having an average pore size for the three zones of approximately 5.0; 2.4; and 1.2 µm) was laminated a second intermediate layer (having an average pore size for the three zones of approximately 1.0; 0.8; and 0.65 µm), which in turn, was laminated to a third, bottom layer (having an average pore size for the three zones of approximately 5.0; 2.4; and 1.2 µm).

The result was nine independent porous zones with the top surface having the largest pore size progressively extending to smaller pore sizes in the bottom layer. The average pore size for the nine sequential zones were approximately 5.0; 2.4; 1.2; 1.0; 0.8; 0.65; 0.45; 0.30; and 0.20 µm.

The lamination methods generally described in U.S. Pat. No. 3,876,738 (Marinaccio et al.) and the processes generally described in Defensive Publication T-103,601 (Repetti).

Briefly, the Marinaccio reference method comprises casting a polymer dope in a thin layer, quenching the dope in a solvent bath to form a continuous microporous membrane, and rinsing the membrane in a water bath to remove residual solvent. This is the wet-as-cast membrane, before it has an opportunity to dry. Wet-as-cast layers of Marinaccio membranes have the ability to form strong physical bonding between individual layers when laminated in the manner described in Defensive Publication T-103,601 (Repetti). Briefly, the individual layers (individual three zone membranes) were wet laminated wherein membranes that have been cast and quenched but not dried are joined under mild pressure and then dried together.

Preparation 3: Graft Functionalization of Nylon Nonwoven Substrate A

A 30 cm by 43 cm sample of Nylon Nonwoven Substrate A of Preparation 1 was purged of air under a nitrogen atmosphere in a glove box and inserted into a ZIPLOC™ plastic bag and sealed. The sealed bag was then removed from the glove box and irradiated to a dose level of 40 kGy by passing it through the electron beam set with an accelerating voltage of 300 kV and a web speed of 20 feet/minute. After returning the sealed bag to the nitrogen atmosphere-controlled glove box, the irradiated nonwoven substrate was removed and placed inside a non-irradiated, nitrogen purged, ZIPLOC™ bag.

The freshly prepared nonwoven sample was imbibed with 100 grams of the nitrogen purged imbibing solution comprising the mixture shown in Table 1, and the bag resealed after expelling most of the nitrogen. During this step the oxygen level within the glove box was generally maintained below 40 parts per million (ppm).

The sample was maintained flat in the bag and evenly saturated for 12 hours. The resulting grafted nylon nonwoven substrate was removed from the bag and carefully washed by soaking it for 10 minutes in a tray containing 2 liters of fresh deionized water. The substrate was removed from the tray, compressed between multiple layers of paper towels and the washing process repeated two more times with fresh deionized water and air dried.

TABLE 1

| Grafted sample | Imbibing solution |
|---|---|
| A | 15% 2-Acrylamido-2-methylpropanesulfonic acid, ammonium salt monomer (AMPS), 15% methanol, and 70% water by weight |
| B | 20% 2-Acrylamido-2-methylpropanesulfonic acid, ammonium salt monomer (AMPS), 15% methanol, and 65% water by weight |
| C | 25% 2-Acrylamido-2-methylpropanesulfonic acid, ammonium salt monomer (AMPS), 15% methanol, and 60% water by weight |

Preparation 4: Graft Functionalization of Microporous Membrane

The microporous membranes of Preparation 2 were functionalized by imbibing the membrane with a grafting solution consisting of 20% 2-Acrylamido-2-methylpropanesulfonic acid, ammonium salt monomer, 15% methanol, 65% water by weight. The membrane was sandwiched between two 4 mil. (101.6 μm) polyethylene terephthalate (PET) liners, rolled with a rubber roller to remove air and excess solution and irradiated directly by passing through an electron beam at a web speed of 20 feet per minute (fpm) (6.1 m/min) and receiving a dosage of approximately 40 kilograys (kGy) at an accelerating voltage of 300 kilovolts with the large pore size surface facing up to the beam. The membranes were washed three times by rinsing in deionized water and then air dried.

Static Binding Capacity Test

A ~0.6 mg/mL IgG (Human Immunoglobulin G from Equitech Bio (Kerrville, Tex.)) challenge solution was prepared in 50 mM acetate buffer with 40 mM NaCl, at pH 4.5.

25 mm diameter discs of the functionalized substrates A, B and C from Preparation 3 were punched out using a die-cut punch. The sample prepared with the asymmetric nylon microporous membrane of Preparation 4 is designated "D".

15 and 50-ml polypropylene Falcon tubes were provided with 1 and 2 discs as shown in Table 2. The 15 ml tubes were filled with 5 ml of the IgG challenge solution. The 50 ml tubes were filled with 40 ml of the same challenge solution. The tubes were rocked overnight at room temperature. The concentration of unbound IgG remaining in the solution was determined by measuring the UV absorbance at 280 nm. The static binding capacity of the membranes was calculated by using the equation:

$$\text{Static capacity} = \frac{(\text{challenge volume} \times \text{initial concentration}) - (\text{challenge volume} \times \text{final concentration})}{\text{web volume}}$$

The results are shown in Table 2. "Web volume refers to the measured volume of web that is being challenged by the IgG solution, determined from measurement of the frontal area of the disc stack and the stack thickness.

TABLE 2

| SAMPLE | Number of layers (25 mm dia) | Web Volume (ml) | IgG challenge (mg) | IgG bound on grafted nonwoven substrate | Static capacity (mg/ml) |
|---|---|---|---|---|---|
| A | 1 | 0.137 | 2.9 | 2.83 | 20 |
| A | 2 | 0.275 | 23.2 | 16.3 | 60 |
| B | 1 | 0.22 | 2.9 | 2.56 | 11 |
| B | 2 | 0.44 | 23.2 | >23.2 | >53 |
| C | 1 | 0.137 | 2.9 | 2.85 | 21 |
| C | 2 | 0.275 | 23.2 | >23.2 | >84 |
| D | 1 | 0.2 | 2.9 | 2.5 | 12.5 |

Dynamic Binding Capacity

Human Immunoglobulin G (Equitech Bio, Kerrville, Tex.) was prepared as a challenge solution of concentration 4 mg/ml in 50 mM acetate buffer with 40 mM NaCl at pH 4.5. The absorbance at 280 nm of the challenge solution was determined experimentally, and is denoted as the absorbance maximum. The membranes were analyzed for dynamic binding by running the challenge solution through a 4-layer stack of discs (from Preparation 3 and 4) placed in a 25 mm diameter holder attached to an AKTA chromatography system (GE Healthcare, N.Y.).

The flow rate was 1 ml/min and the UV detector was set to monitor at a wavelength of 280 nm. The IgG breakthrough curves were used to determine the challenge volume corresponding to 5 and 10% of the absorbance maximum. The dynamic binding capacity (DBC) of the membrane at 5 and 10% breakthrough is calculated by the following equation $$DBC = \frac{\text{Challenge volume} \times \text{concentration}}{\text{web volume}}$$

Figure 6:
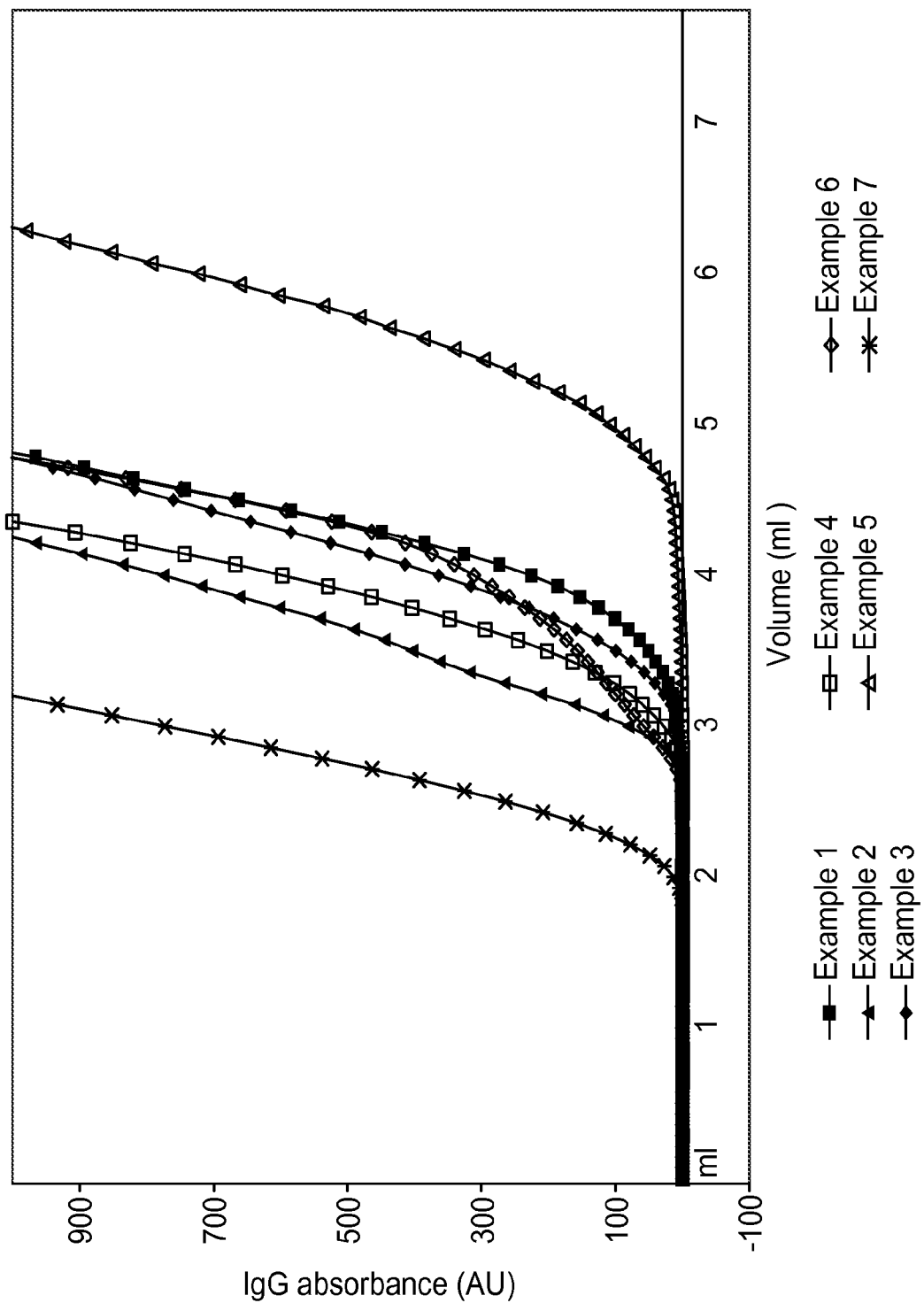
FIG. 6 plots the IgG breakthrough curves for Example 1-7.

The DBC results are shown in Table 3 and FIG. 6. In Examples 1 to 6, either an ungrafted microporous membrane (from Preparation 2), or a grafted microporous membrane (from Preparation 4) was placed downstream of the 3-layer stack of grafted nonwoven substrates, as indicated in Table 3.

For purposes of comparison, the 4-layer stack of grafted nonwoven substrates were replaced by 3 layers of grafted microporous membrane "D" from Preparation 4, followed by a downstream layer of ungrafted microporous membrane from Preparation 2. The results are shown in Table 3 and FIG. 6.

TABLE 3

| Example | Grafted nonwoven - A, B, C | # layers of grafted nonwoven (Prep 3) | # layers of ungrafted Microporous (Prep 2) | # layers of grafted microporous (Prep 4) | Web volume (ml) | 10% DBC mg/ml | 5% DBC mg/ml |
|---|---|---|---|---|---|---|---|
| 1 | A | 3 | 1 |   | 0.06 | 32 | 30 |
| 2 | B | 3 | 1 |   | 0.043 | 37 | 33 |
| 3 | C | 3 | 1 |   | 0.043 | 42 | 38 |
| 4 | A | 3 |   | 1 | 0.043 | 39 | 35 |
| 5 | B | 3 |   | 1 | 0.043 | 58 | 54 |
| 6 | C | 3 |   | 1 | 0.043 | 44 | 40 |
| 7 |   |   | 1 | 3 | 0.09 | 14 | 13 |

What is claimed is:

1. An article comprising:
a) a nonwoven substrate having average fiber diameter of 1 to 6 micrometers, and a void volume of 50 to 95%, a tensile strength of at least 4.0 Newtons prior to grafting and a polymer grafted to the surface of the nonwoven substrate wherein the grafted polymer comprises polymerized monomer units of:
a) 80 to 98 wt. % of grafting anionic monomers;
b) 2 to 20 wt. % of grafting poly(alkylene oxide) monomers;
c) 0 to 10 wt. % of second hydrophilic monomers.

2. The article of claim 1 wherein the nonwoven substrate has a surface area of 15 to 50 m² per square meter of nonwoven substrate.

3. The article of claim 1 wherein the nonwoven substrate has a mean pore size of 1-40 microns according to ASTM F 316-03 5.

4. The article of claim 1 wherein the nonwoven substrates have a solidity of less than 20%.

5. The article of claim 1 wherein the nonwoven substrate is a spunlaid, spunlaced, hydroentangled, wet-laid electrospun or a meltblown nonwoven substrate.

6. The article of claim 1 wherein the weight of the grafted polymer is 0.5 to 5 times the weight of the nonwoven substrate.

7. The article of claim 1 wherein the nonwoven substrate is prepared from a hydrophilic thermoplastic polymer.

8. The article of claim 1 wherein the grafted polymer is of the formula

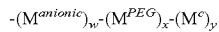

wherein
-$(M^{anioni})_W$ represen the residue of the grafted anionic monomer having w polymerized monomer units where w is at least 2, -$(M^{PEG})_x$ represents the polymerized poly(alkylene oxide) monomer having x polymerized monomer units, where x is at least one;

-$(M^c)_y$ represents the polymerized hydrophilic monomer having y polymerized monomer units, where y may be zero.

9. The article of claim 8 wherein the grafted polymer is a random or block copolymer.

10. The article of claim 1 wherein the grafted polymer is uncrosslinked.

11. The article of claim 1 wherein the nonwoven substrate has a basis weight of 10 to 400 g/m².

12. The article of claim 1 wherein the nonwoven substrate is a nylon nonwoven substrate.

13. A filter device comprising:
a fluid inlet;
a fluid outlet; and
a filter media fluidly connecting the fluid inlet and the fluid outlet;
wherein the filter media comprises the grafted nonwoven substrate of claim 1.

14. The filter device of claim 13 wherein the filter media further comprises a microporous membrane layer positioned downstream of the grafted nonwoven substrate.

15. The filter device of claim 13 wherein the filter media comprises a plurality of pleats.

16. The filter device of claim 15 wherein the filter media comprises a plurality of pleats.

17. The filter device of claim 13 further comprising:
a filter capsule; and
a filter cap connected to the filter capsule;
wherein the filter cap comprises the fluid inlet and the fluid outlet, and wherein the filter media is encapsulated in the filter capsule.

18. The filter device of claim 17 wherein the filter media further comprises a microporous membrane layer positioned downstream of the grafted nonwoven substrate.

19. The filter device of claim 17 wherein the filter media is formed into a first media cylinder comprising a plurality of pleats.

20. The filter device of claim 19 further comprising a second media cylinder positioned within the first media cylinder, the second media cylinder comprising a second filter media comprising a plurality of pleats.

21. The filter device of claim 17 further comprising a second media cylinder positioned within the first media cylinder, the second media cylinder comprising a second filter media comprising a plurality of pleats.

22. The filter device of claim 13 further comprising a core, wherein the filter media is spirally wound about the core.

* * * * *

UNITED STATES PATENT AND TRADEMARK OFFICE
CERTIFICATE OF CORRECTION

PATENT NO. : 8,329,034 B2  
APPLICATION NO. : 12/819261  
DATED : December 11, 2012  
INVENTOR(S) : Clinton P Waller Page 1 of 1

It is certified that error appears in the above-identified patent and that said Letters Patent is hereby corrected as shown below:

Column 16
Line 49, delete "pleats126" and insert -- pleats 216 --, therefor.
Line 55, delete "layer124." and insert -- layer 124. --, therefor.

Column 25
Line 56, in Claim 6, delete "5times" insert -- 5 times --, therefor.
Line 64, in Claim 8, delete "-$(M^{anioni})_w$ represen" and insert -- -$(M^{anionic})_w$ represent --, therefor.

Column 26
Line 1, in Claim 8, delete "-$(M^{PEG})_x$" insert -- -$(M^{PEG})_x$ --, therefor.

Signed and Sealed this  
Twelfth Day of March, 2013

Teresa Stanek Rea  
*Acting Director of the United States Patent and Trademark Office*